United States Patent
Sakagami et al.

(10) Patent No.: US 8,060,221 B2
(45) Date of Patent: Nov. 15, 2011

(54) PERIPHERAL DEVICE OF PROGRAMMABLE LOGIC CONTROLLER

(75) Inventors: Kaori Sakagami, Aichi (JP); Masanobu Sumiya, Aichi (JP); Tomohiro Sato, Aichi (JP); Makoto Nonomura, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 494 days.

(21) Appl. No.: 12/304,632

(22) PCT Filed: Jun. 13, 2006

(86) PCT No.: PCT/JP2006/311807
§ 371 (c)(1),
(2), (4) Date: Feb. 9, 2009

(87) PCT Pub. No.: WO2007/144936
PCT Pub. Date: Dec. 21, 2007

(65) Prior Publication Data
US 2010/0049337 A1    Feb. 25, 2010

(51) Int. Cl.
G05B 11/01    (2006.01)
G06F 9/44    (2006.01)
(52) U.S. Cl. ............ 700/23; 700/26; 717/124; 717/126; 717/127; 717/128; 717/131; 717/132
(58) Field of Classification Search .................... 700/23, 700/26; 717/124, 126–128, 131–132
See application file for complete search history.

(56) References Cited

U.S. PATENT DOCUMENTS

| 5,438,574 | A |   | 8/1995 | Taniguchi | |
|---|---|---|---|---|---|
| 5,687,074 | A | * | 11/1997 | Tanaka et al. | 700/26 |
| 5,758,123 | A | * | 5/1998 | Sano et al. | 703/22 |
| 5,793,947 | A | * | 8/1998 | Sakamoto | 714/45 |
| 5,889,669 | A | * | 3/1999 | Kagami et al. | 700/17 |
| 5,991,533 | A | * | 11/1999 | Sano et al. | 703/28 |
| 6,145,123 | A | * | 11/2000 | Torrey et al. | 717/128 |
| 6,442,441 | B1 | * | 8/2002 | Walacavage et al. | 700/86 |
| 6,826,747 | B1 | * | 11/2004 | Augsburg et al. | 717/128 |
| 7,587,709 | B2 | * | 9/2009 | Chilimbi et al. | 717/130 |
| 7,827,022 | B2 | * | 11/2010 | Kline, Jr. | 703/22 |
| 2003/0033592 | A1 | * | 2/2003 | Tsubata et al. | 717/128 |
| 2003/0110477 | A1 | * | 6/2003 | Wakabayashi et al. | 717/135 |

(Continued)

FOREIGN PATENT DOCUMENTS

DE    69223820 T2    8/1998

(Continued)

OTHER PUBLICATIONS

Notice of Rejection issued in corresponding Japanese Patent Application No. 2008-521050 dated May 18, 2011.

*Primary Examiner* — Ronald Hartman, Jr.
(74) *Attorney, Agent, or Firm* — Sughrue Mion, PLLC

(57) ABSTRACT

A tracing-result optimization processing unit generates an optimized tracing result. A tracing-result collation processing unit collates the optimized tracing result and a time chart as a basis of a sequence processing for an external apparatus and detects shift of the optimized tracing result. A tracing-result storing unit accumulates and stores therein a tracing result obtained by a programmable logic controller at predetermined time intervals. Every time the tracing result is stored in the tracing-result storing unit, the tracing-result optimization processing unit generates the optimized tracing result.

5 Claims, 19 Drawing Sheets

U.S. PATENT DOCUMENTS

| | | | |
|---|---|---|---|
| 2005/0033457 A1* | 2/2005 | Yamane | 700/18 |
| 2006/0116777 A1* | 6/2006 | Dax et al. | 700/18 |
| 2008/0126973 A1* | 5/2008 | Kline | 715/772 |

FOREIGN PATENT DOCUMENTS

| | | |
|---|---|---|
| EP | 0628182 B1 | 12/1994 |
| JP | 63-068904 A | 3/1988 |
| JP | 64-003748 A | 1/1989 |
| JP | 02-294841 A | 12/1990 |
| JP | 03-014180 A | 1/1991 |
| JP | 05-081009 A | 4/1993 |
| JP | 05-189026 A | 7/1993 |
| JP | 06-289928 A | 10/1994 |
| JP | 08-194634 A | 7/1996 |
| JP | 09-026805 A | 1/1997 |
| JP | 2000-259216 A | 9/2000 |
| JP | 2002-073619 A | 3/2002 |
| JP | 2002-099312 A | 4/2002 |
| JP | 2002-163020 A | 6/2002 |
| JP | 2002-268079 A | 9/2002 |
| JP | 2003-248504 A | 9/2003 |

* cited by examiner

FIG.3

| DEVICE NAME [PROGRAM] [STEP NUMBER] | ELAPSED TIME 1 | ELAPSED TIME 2 | ELAPSED TIME 3 | ELAPSED TIME 4 | ELAPSED TIME 5 | ELAPSED TIME 6 | ELAPSED TIME 7 | ... |
|---|---|---|---|---|---|---|---|---|
| | ON/OFF STATE (*1) | ON/OFF STATE (*1) | ON/OFF STATE (*1) | ON/OFF STATE (*1) | ON/OFF STATE (*1) | ON/OFF STATE (*1) | ON/OFF STATE (*1) | ... |
| ... | ... | ... | ... | ... | ... | ... | ... | ... |

(*1) ON/OFF STATE IS REPRESENTED BY FOLLOWING NUMERICAL VALUES
ON: 1
OFF: 0

PERIPHERAL DEVICE OF PROGRAMMABLE LOGIC CONTROLLER

TECHNICAL FIELD

The present invention relates to a PLC peripheral device that performs creation and editing of a sequence program for a programmable logic controller (PLC).

BACKGROUND ART

Conventionally, a sequence program test method for performing an operation test for a sequence program created from a time chart in a PLC peripheral device has been proposed (see, for example, Patent Document 1). In the sequence program test method disclosed in Patent Document 1, based on a sequence time chart as operation patterns of an apparatus controlled by a sequencer program, an operation pattern matrix table obtained by digitizing the operation patterns is created in advance and a value obtained by digitizing an operation output from the apparatus controlled by the sequencer program and the operation pattern matrix table are compared. When the value and the operation pattern matrix table coincide with each other, it is judged that the sequencer program is normal. When the value and the operation pattern matrix table do not coincide with each other, it is judged that the sequencer program is abnormal and a result of the judgment is output to an operator of the peripheral device of the PLC.

Patent Document 1: Japanese Patent Application Laid-open No. 2002-73619

DISCLOSURE OF INVENTION

Problem to be Solved by the Invention

However, in the sequence program test method disclosed in Patent Document 1, the shift of timing caused by performance peculiar to the apparatus controlled by the sequence program is not taken into account. As a result, the operation pattern matrix table as a reference of comparison and the value obtained by digitizing the operation output from the apparatus to be compared do not coincide with each other in a strict sense. Therefore, there is a problem in that, in judgment processing, an error rate for allowing the shift between the operation pattern matrix table and the value has to be set and highly accurate judgment cannot be performed. Further, there is also a problem in that, when highly accurate judgment is performed, the operator has to perform debagging of the value obtained by digitizing the operation output from the apparatus.

The present invention has been devised in view of the above and it is an object of the present invention to obtain a peripheral device of a programmable logic controller that can highly accurately execute verification of a sequence program created based on a time chart. It is also an object of the present invention to obtain a peripheral device of a programmable logic controller that can detect the shift of a tracing result, which is obtained when a sequence program is actually executed, from the time chart due to elapse of time. Moreover, it is also an object of the present invention to obtain a peripheral device of a programmable logic controller that can detect a device and a position on the sequence program as a cause of the shift of the tracing result from the time chart, correct an automatically correctable section, and display a section that is not automatically correctable.

Means for Solving Problem

To achieve the object, a PLC peripheral device according to the present invention is configured to be connected to a programmable logic controller (PLC) that controls an external apparatus based on a sequence program, and verifies an operation state of the sequence program in the PLC. The PLC peripheral device includes a tracing-result optimization processing unit that generates an optimized tracing result obtained by correcting, based on performance of the external apparatus, a tracing result obtained by the PLC executing sequence processing corresponding to a predetermined signal input/output unit out of external apparatuses; and a tracing-result collation processing unit that collates the optimized tracing result and a time chart as a basis of the sequence processing for the external apparatus and detects shift of the optimized tracing result. To achieve the object, a PLC peripheral device according to the present invention is connected to a programmable logic controller, which controls an external apparatus based on a sequence program, and verifies an operation state of the sequence program in the programmable logic controller. The Programmable-logic-controller peripheral device includes a tracing-result optimization processing unit that generates an optimized tracing result obtained by correcting, based on performance of the external apparatus, a tracing result obtained by the programmable logic controller executing sequence processing corresponding to a predetermined signal input/output unit out of external apparatuses; a tracing-result collation processing unit that collates the optimized tracing result and a time chart as a basis of the sequence processing for the external apparatus and detects shift of the optimized tracing result; and a tracing-result storing unit that accumulates and stores therein a tracing result obtained by the programmable logic controller executing, at predetermined time intervals, the sequence processing for the predetermined signal input/output unit out of the external apparatuses. Every time the tracing result is stored in the tracing-result storing unit, the tracing-result optimization processing unit generates a optimized tracing result, and the tracing-result collation processing unit has a function of performing collation of the optimized tracing result and the time chart and detecting shift of timing due to elapse of time.

Effect of the Invention

According to the present invention, when the verification of a sequence program created from a time chart is performed, tracing is executed and a tracing result after optimization, which takes into account a performance error of a verification target apparatus, and the time chart are compared. Therefore, there is an effect that a user can efficiently and accurately verify the sequence program without debagging the tracing result obtained by the PLC. Furthermore, the shift of timing due to performance of an external apparatus as an execution target of the sequence program is excluded from a comparison target. Therefore, there is an effect that it is possible to detect only original problems of the sequence program.

BRIEF DESCRIPTION OF DRAWINGS

FIG. 3 is a data structure diagram of a time chart and a tracing result in the PLC peripheral device.

Figure 1:
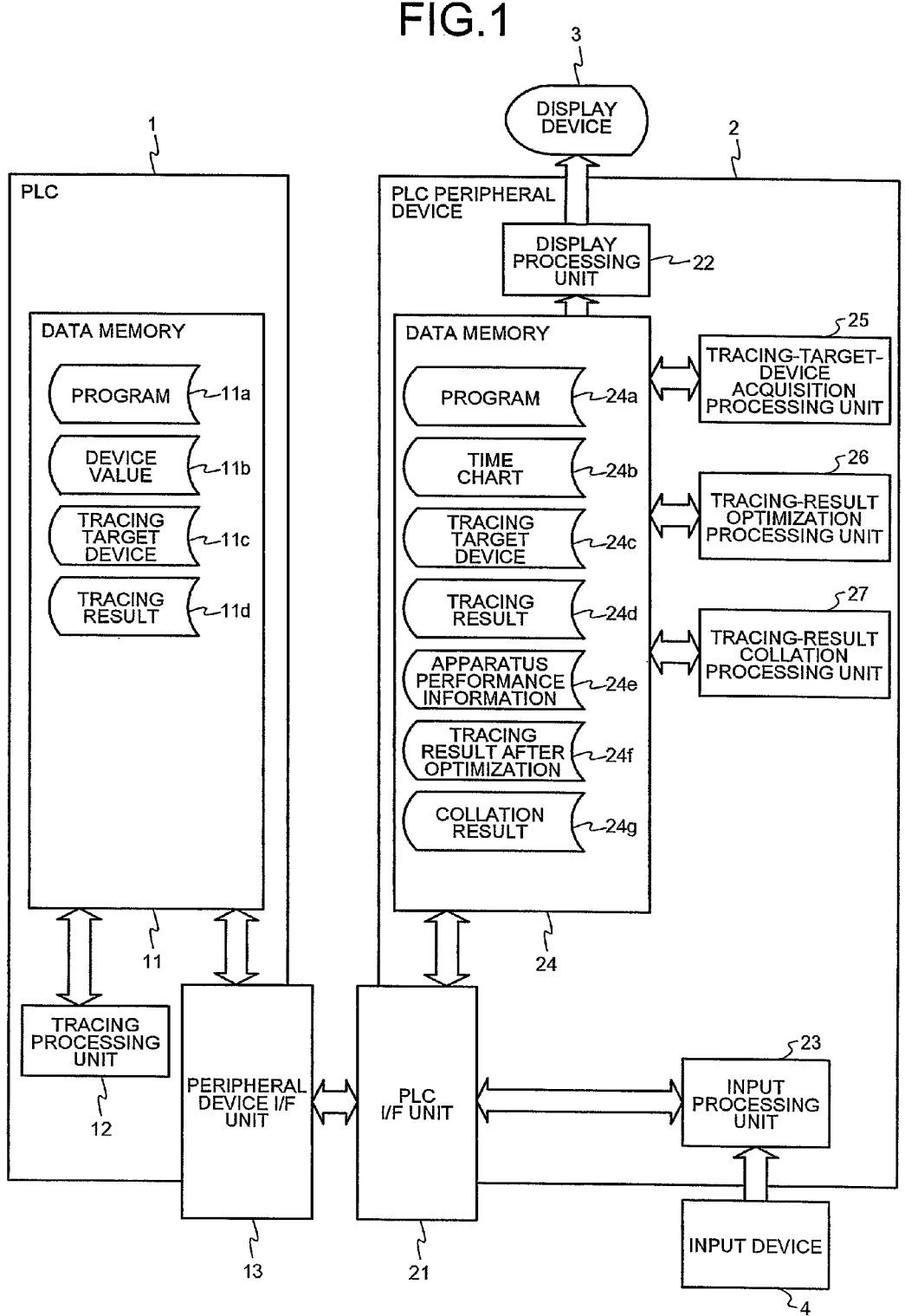
FIG. 1 is a schematic block diagram of the structure of a first embodiment of a PLC peripheral device according to the present invention and the PLC.

EXPLANATIONS OF LETTERS OR NUMERALS 1 programmable logic controller (PLC)
2 PLC peripheral device
3 display device
4 input device
11, 24 data memory
12 tracing unit
13 peripheral device I/F unit
21 PLC I/F unit
22 display processing unit
23 input processing unit
25 tracing-target-device acquisition processing unit
26 tracing-result optimization processing unit
27 tracing-result collation processing unit
28 correction-target-timing detection processing unit
29 timing correction processing unit
30 correction-target-sequence-program detection processing unit
221 sequence-program highlighting function

BEST MODE(S) FOR CARRYING OUT THE INVENTION

Exemplary embodiments of a peripheral device of a programmable logic controller (PLC) (hereinafter, "PLC peripheral device") and an automatic verification method for a program are explained in detail below with reference to the accompanying drawings. The present invention is not limited by these embodiments.

First Embodiment

FIG. 1 is a schematic block diagram of the structure of a first embodiment of the PLC peripheral device according to the present invention and the PLC. A PLC peripheral device 2 is connected to a main body of a PLC 1 that controls a control target apparatus and the like. A display device 3 such as a CRT (Cathode Ray Tube) or an LCD (Liquid Crystal Display) and an input device 4 such as a keyboard are connected to the PLC peripheral device 2.

The PLC 1 includes a data memory 11 that stores a sequence program, a device value, and the like, a tracing unit 12 that executes sample tracing, and a peripheral device I/F unit 13 as an interface with a main body of the PLC peripheral device 2. In the data memory 11, information including a program 11a such as a sequence program, a device value 11b as a result of sequentially executing commands of the sequence program, a tracing target device 11c for designating a device as a tracing target, and a tracing result 11d of the tracing target device is stored.

The PLC peripheral device 2 includes a PLC interface (I/F) unit 21 as an interface with the main body of the PLC 1, a display processing unit 22 for displaying information on the display device 3, an input processing unit 23 that processes an input from the input device 4, a data memory 24 that stores a program for performing tracing and the like, a tracing-target-device acquisition processing unit 25 that acquires a tracing target device 24c from a time chart 24b stored in the data memory 24, a tracing-result optimization processing unit 26 that optimizes a tracing result 24d taking into account performance of the apparatus, and a tracing-result collation processing unit 27 that collates a time chart 24b stored in the data memory and a tracing result after optimization 24f.

In the data memory 24, information including a program 24a for performing, for example, processing for optimizing a tracing result and collating the tracing result with a time chart, the time chart 24b executed by an apparatus as a control target of the PLC 1, the tracing target device 24c for designating a device as a target of tracing, the tracing result 24d as a result of tracing by the PLC 1, apparatus performance information 24e as information concerning performance of an apparatus connected to the PLC 1, the tracing result after optimization 24f created by the tracing-result optimization processing unit 26, and a collation result 24g processed by the tracing-result collation processing unit 27 is stored.

Figure 2:
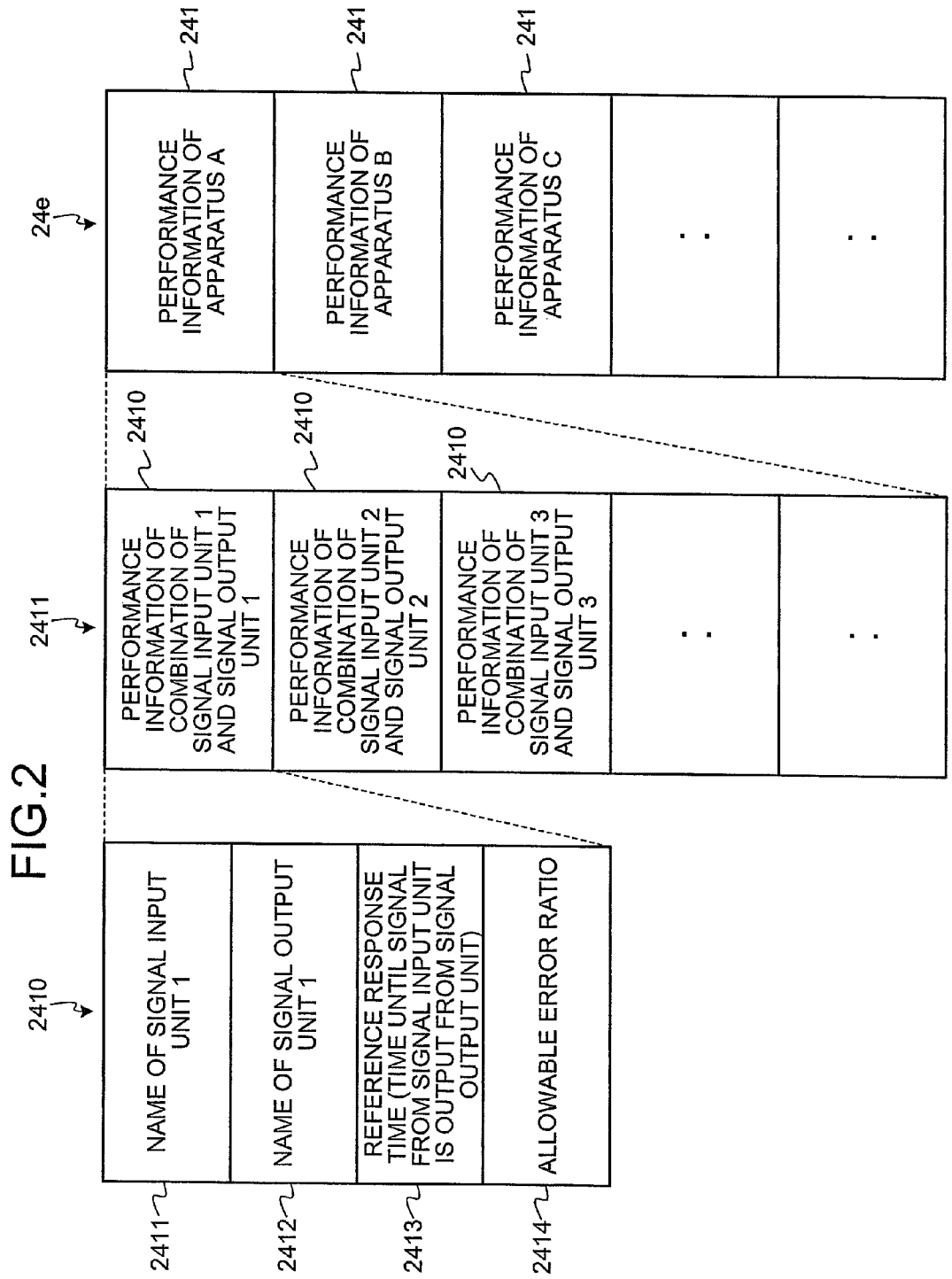
FIG. 2 is a data structure diagram of apparatus performance information in the PLC peripheral device.

FIG. 2 is a data structure diagram of apparatus performance information in the PLC peripheral device. The apparatus performance information 24e is performance information concerning an apparatus as a control target connected to the PLC 1. Specifically, the apparatus performance information 24e is information for correcting a tracing result of the apparatus including the shift of timing due to performance of the apparatus. The apparatus performance information 24e includes an aggregate of performance information 241 of a plurality of apparatuses. The performance information 241 of the apparatuses is an aggregate of signal-input/output-unit combination performance information 2410 obtained by combining signal input units and signal output units of the apparatuses. Each piece of the signal-input/output combination performance information 2410 includes a name 2411 of a signal input unit, a name 2412 of a signal output unit, reference response time 2413 as time until a signal from the signal input unit 2411 of the apparatus is output from the signal output unit 2412, and an allowable error ratio 2414 as an error ratio allowed for the reference response time 2413. These pieces of information are information set in advance in the PLC peripheral device 2. However, it is assumed that the allowable error ratio 2414 can be changed to an arbitrary value by a user.

FIG. 3 is a data structure diagram of a time chart and a tracing result in the PLC peripheral device. The time chart and the tracing result have a common data structure. As shown in the figure, the time chart or the tracing result stores, for each of devices, an ON/OFF state for each elapsed time. For example, an ON state is represented by "1" and an OFF state is represented by "0". A device name is specified by a combination of a program name and a step number.

When an automatic verification instruction for a sequence program input by the user is received from the input device 4, the tracing-target-device acquisition processing unit 25 acquires, from the time chart 24b stored in the data memory 24, a device for which tracing is executed. The tracing-target-device acquisition processing unit 25 stores the acquired device in the data memory 24 as the tracing target device 24c. Specifically, the tracing-target-device acquisition processing unit 25 selects, as the tracing target device 24c, a device registered in the time chart 24b in the data memory 24 and acquires the device.

The tracing-result optimization processing unit 26 optimizes the tracing result 24d in the data memory 24 taking into account performance of the apparatus that performs the tracing. Specifically, the tracing-result optimization processing unit 26 performs, concerning tracing result data related to tracing result data output from the signal output unit of the apparatus in the tracing result 24d in the data memory 24, processing for subtracting the reference response time 2413 of the apparatus performance information 24e shown in FIG. 2. The tracing result optimized by the tracing-result optimization processing unit 26 is referred to as a tracing result after optimization. The tracing-result optimization processing unit 26 stores the tracing result after optimization 24f in the data memory 24.

The tracing-result collation processing unit 27 collates the time chart 24b concerning the tracing target device 24c stored in the data memory 24 and the tracing result after optimization 24f of the device of the apparatus corresponding to the time chart 24b and stores the collation result 24g in the data memory 24. It is collated whether the tracing result after optimization 24f is, compared with the time chart 24b corresponding thereto, within the allowable error ratio 2414 of the apparatus performance information 24e shown in FIG. 2.

Figure 4:
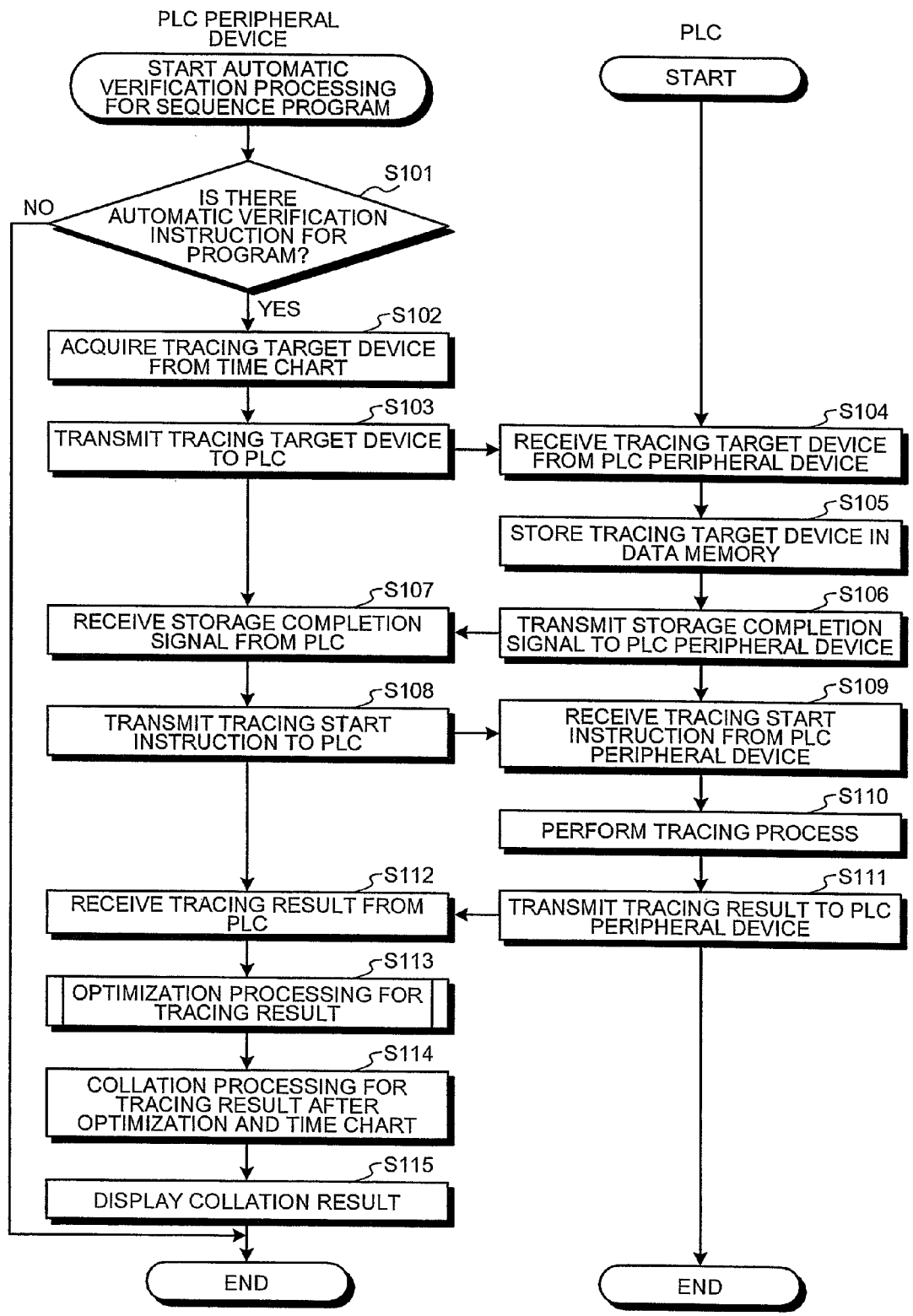
FIG. 4 is a flowchart of an example of a procedure of sequence program automatic verification processing in the PLC and the PLC peripheral device.

FIG. 4 is a flowchart of an example of a procedure of sequence program automatic verification processing in the PLC and the PLC peripheral device shown in FIG. 1. First, the PLC peripheral device 2 discriminates presence or absence of an automatic verification instruction for a sequence program from a user (an operator) (step S101). When there is no automatic verification instruction for a sequence program from the user ("No" at step S101), the sequence program automatic verification processing in the PLC peripheral device 2 ends. On the other hand, when there is an automatic verification instruction for a sequence program from the user ("Yes" at step S101), the tracing-target-device acquisition processing unit 25 acquires the tracing target device 24c from the time chart 24b in the data memory 24 (step S102). Specifically, the tracing-target-device acquisition processing unit 25 acquires, as the tracing target device 24c, a device registered in the time chart 24b stored in the data memory 24 and sets the tracing target device 24c in the data memory 24. Subsequently, the tracing-target-device acquisition processing unit 25 transmits the acquired tracing target device 24c to the PLC 1 via the PLC I/F unit 21 (step S103).

The PLC 1 receives the tracing target device from the PLC peripheral device (step S104). The PLC 1 stores the received tracing target device 11c in the data memory 11 (step S105). Thereafter, the PLC 1 transmits a storage completion signal indicating that the tracing target device 11c is stored in the data memory 11 to the PLC peripheral device 2 via the peripheral device I/F unit (step S106).

The PLC peripheral device 2 receives the storage completion signal from the PLC 1 (step S107). The PLC peripheral device 2 transmits a tracing start instruction to the PLC 1 via the PLC I/F unit 21 (step S108). The PLC 1 receives the tracing start instruction from the PLC peripheral device 2 (step S109). The PLC 1 executes tracing in the tracing unit 12 of the PLC 1 (step S110). The tracing unit 12 stores, as the tracing result 11d, data being executed by the sequence program in the data memory 11. After the tracing by the tracing unit 12 is executed, the PLC 1 transmits the tracing result 11d to the PLC peripheral device 2 via the peripheral device I/F unit 13 (step S111).

The PLC peripheral device 2 receives the tracing result from the PLC 1 (step S112). The PLC peripheral device 2 stores the received tracing result 24d in the data memory 24. A performance error of an external apparatus is included in the tracing result 24d. Therefore, the tracing-result optimization processing unit 26 carries out optimization processing for removing the performance error of the external apparatus from the tracing result 24d (step S113).

Figure 5:
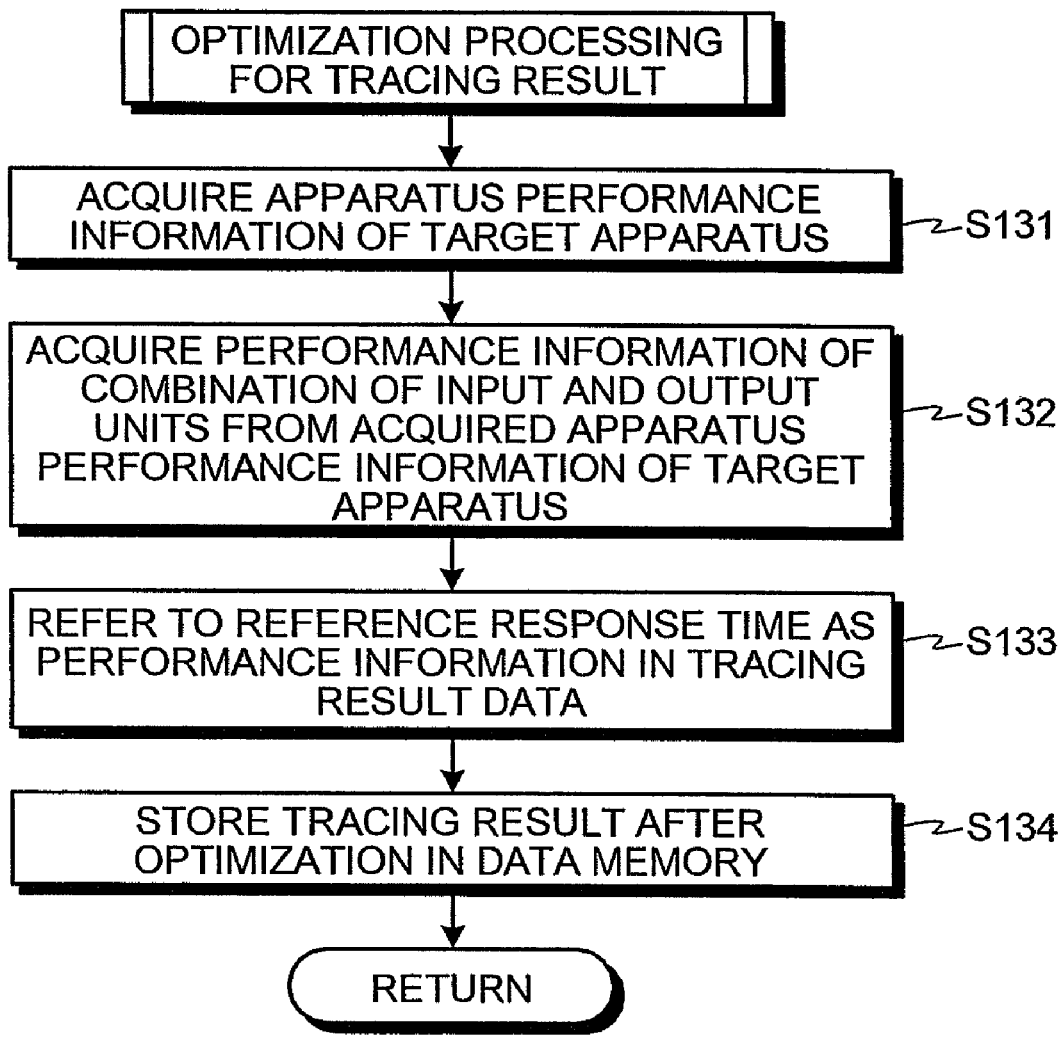
FIG. 5 is a flowchart of an example of a procedure of optimization processing for a tracing result.

FIG. 5 is a flowchart of an example of a procedure of the optimization processing for a tracing result. First, the tracing-result optimization processing unit 26 acquires the apparatus performance information 24e concerning a target apparatus to be subjected to automatic verification (step S131). The tracing-result optimization processing unit 26 further acquires the signal-input/output-unit combination performance information 2410 corresponding to a combination of a signal input unit and a signal output unit subjected to the automatic verification from the acquired apparatus performance information 24e of the target apparatus (step S132). Subsequently, the tracing-result optimization processing unit 26 generates, concerning tracing result data related to an output of the target apparatus in the tracing result 24d stored in the data memory 24, a tracing result after optimization referring to the reference response time 2413 in the signal-input/output-unit combination performance information 2410 (step S133). The tracing-result optimization processing unit 26 stores the generated tracing result after optimization 24f in the data memory 24 (step S134). The optimization processing for the tracing result ends and the processing returns to the flowchart shown in FIG. 4.

Referring back to FIG. 4, the tracing-result collation processing unit 27 extracts the tracing result after optimization 24f and the time chart 24b stored in the data memory 24 and carries out collation processing for the tracing result after optimization 24f and the time chart 24b (step S114). The tracing-result collation processing unit 27 stores the collation result 24g of the collation processing in the data memory 24.

The display processing unit 22 extracts the collation result 24g from the data memory 24 and displays the collation result 24g on the display device 3 connected to the PLC peripheral device 2 (step S115). The sequence program automatic verification processing is finished.

Figure 6:
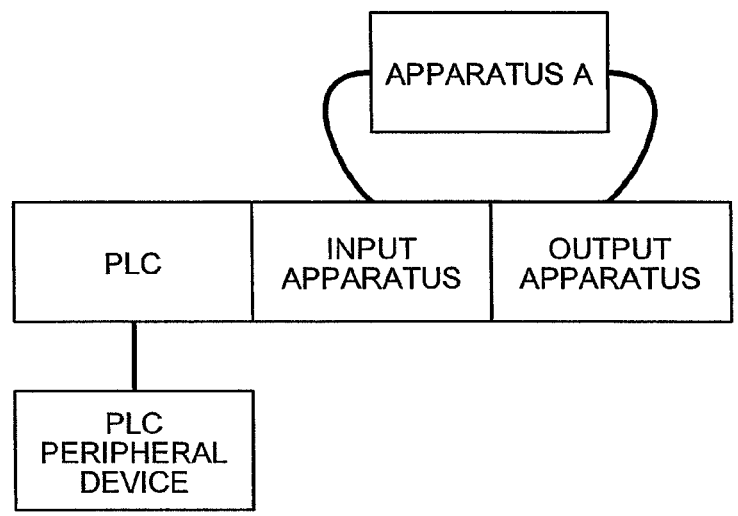
FIG. 6 is a schematic diagram of an example of a configuration of the PLC, the PLC peripheral device, and an external apparatus.
Figure 7:
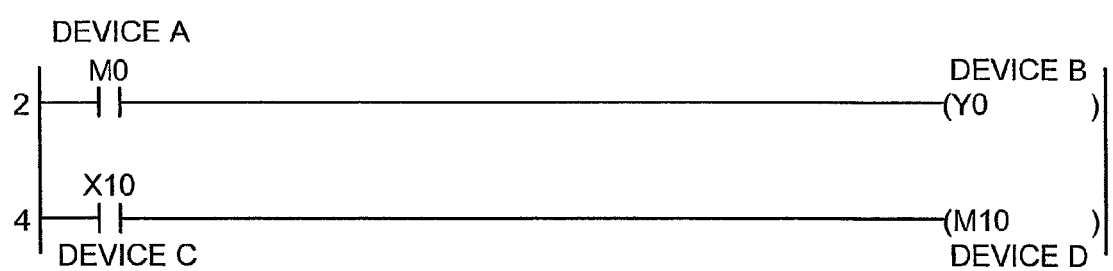
FIG. 7 is a diagram of an example of a sequence program executed in the diagram of FIG. 6.
Figure 8:
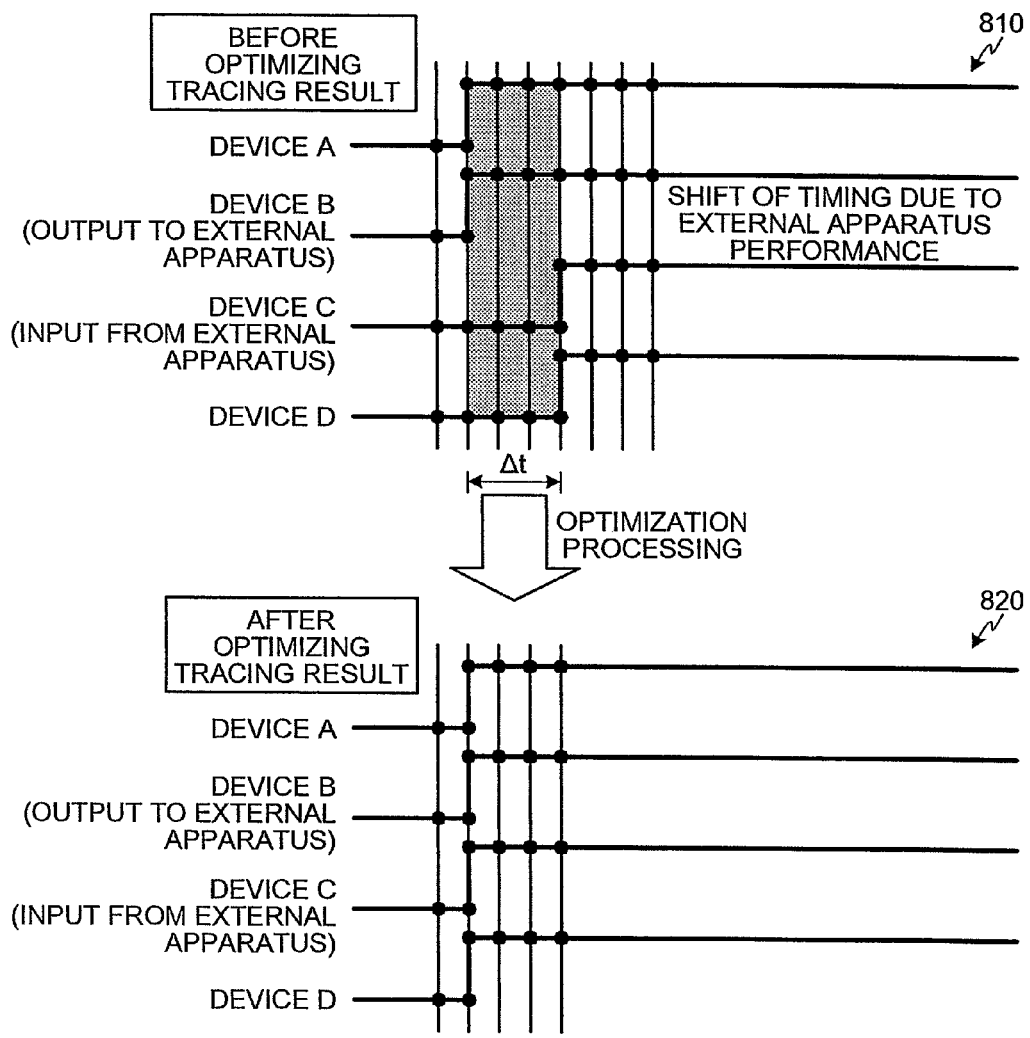
FIG. 8 is a diagram of an example of optimization processing for a tracing result according to the first embodiment.
Figure 9:
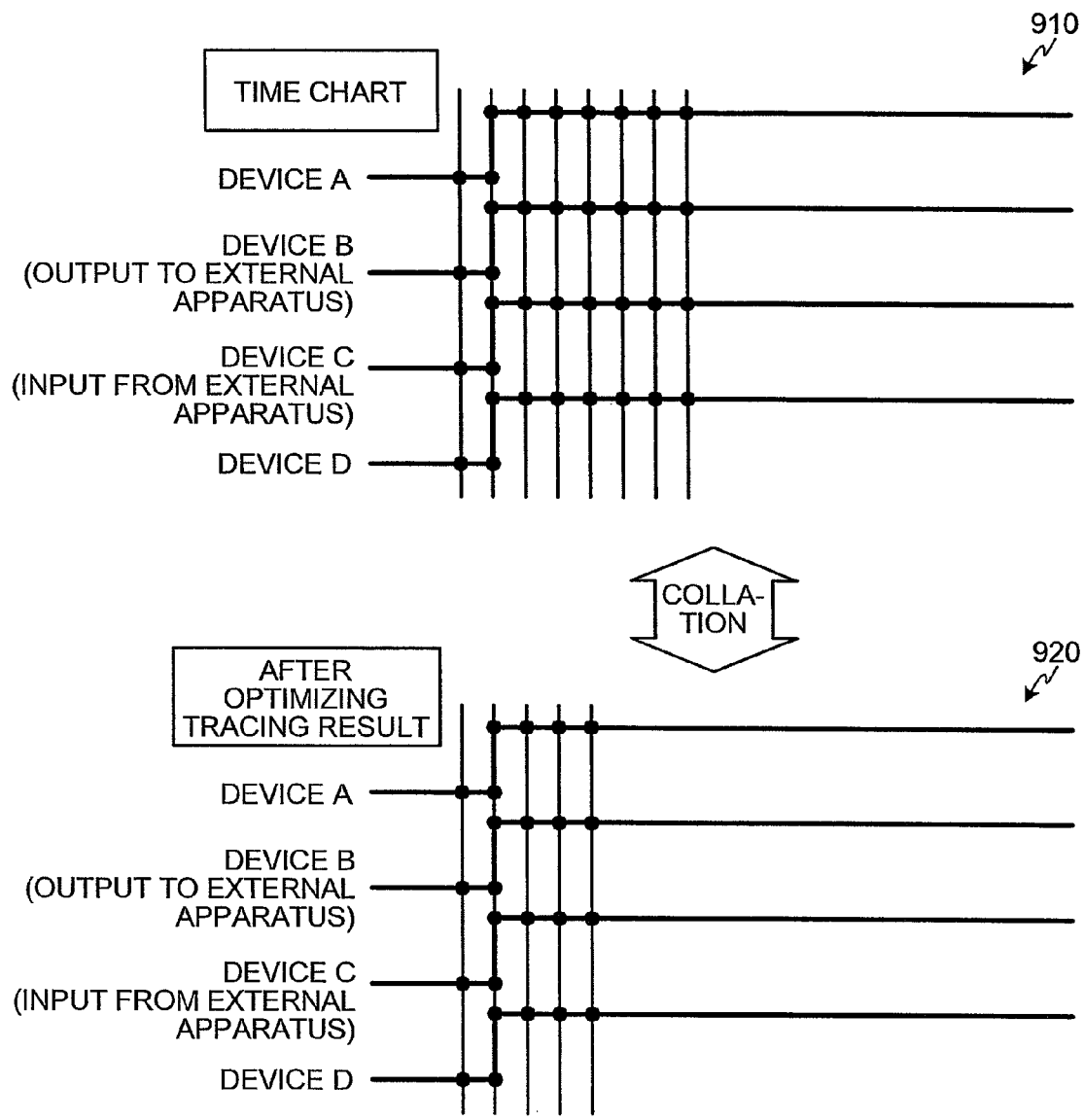
FIG. 9 is a diagram of an example of collation processing of a tracing result after optimization according to the first embodiment.

A specific example of the sequence program automatic verification processing is explained. FIG. 6 is a schematic diagram of an example of a configuration of the PLC, the PLC peripheral device, and the external apparatus. FIG. 7 is a diagram of an example of a sequence program executed in the diagram shown in FIG. 6. FIG. 8 is a diagram of an example of the optimization processing for a tracing result according to the first embodiment. FIG. 9 is a diagram of an example of the collation processing for a tracing result after optimization according to the first embodiment.

Before tracing result optimization 810 shown in FIG. 8 indicates a tracing result of a device obtained by the tracing unit 12 of the PLC 1. As shown in the figure, compared with rising edges of a device A and a device B in a ladder chart of FIG. 7, timing of rising edges of signals of a device C and a device D delays by time Δt. This is shift due to performance of the external apparatus.

For such a tracing result, the tracing-result optimization processing unit 26 of the PLC peripheral device 2 executes the optimization processing using reference response time in performance information corresponding to a combination of a signal input and a signal output of an apparatus A in apparatus performance information. Specifically, the tracing-result optimization processing unit 26 subtracts, concerning the device C as a signal from an output unit of the external apparatus and the device D having this device C as a contact, the reference response time (Δt) acquired from the tracing result and creates a tracing result after optimization. The result is shown in after tracing result optimization 820 shown in FIG. 8.

The reference response time as the performance error of the external apparatus connected to the PLC 1 is not included in a tracing result after optimization 920 shown on a lower side of FIG. 9. Therefore, if the external apparatus is normally operating, the tracing result after optimization 920 coincides with a time chart 910 shown on an upper side of FIG. 9. However, it is likely that the time chart 910 and the tracing result after optimization 920 do not coincide with each other depending on a state of a system configuration and an operation environment. In that case, if the shift between the time chart 910 and the tracing result after optimization 920 is within a range of an allowable error ratio in the signal-input/output-unit combination performance information, the time chart 910 and the tracing result after optimization 920 are regarded as coinciding with each other. As explained above, the optimization processing and the collation processing for the tracing result are performed.

According to the first embodiment, when the verification of a sequence program created from a time chart is performed, the tracing is executed and the tracing result after optimization obtained by subtracting the reference response time as the error time due to the performance of the apparatus from the tracing result is compared with the time chart. Therefore, there is an effect that the user can efficiently and accurately verify the sequence program without performing debagging in the PLC 1. Further, there is an effect that the user can perform, by setting an arbitrary allowable error ratio, verification that allows a performance error likely to be cause by a system configuration and an environment.

Second Embodiment

In a second embodiment of the present invention, a PLC peripheral device is explained that can detect the shift of timing due to elapse of time by accumulating the tracing result after optimization acquired in the first embodiment and collating a result of tracing performed every time a predetermined time set in the PLC peripheral device by an operator elapses and a time chart.

Figure 10:
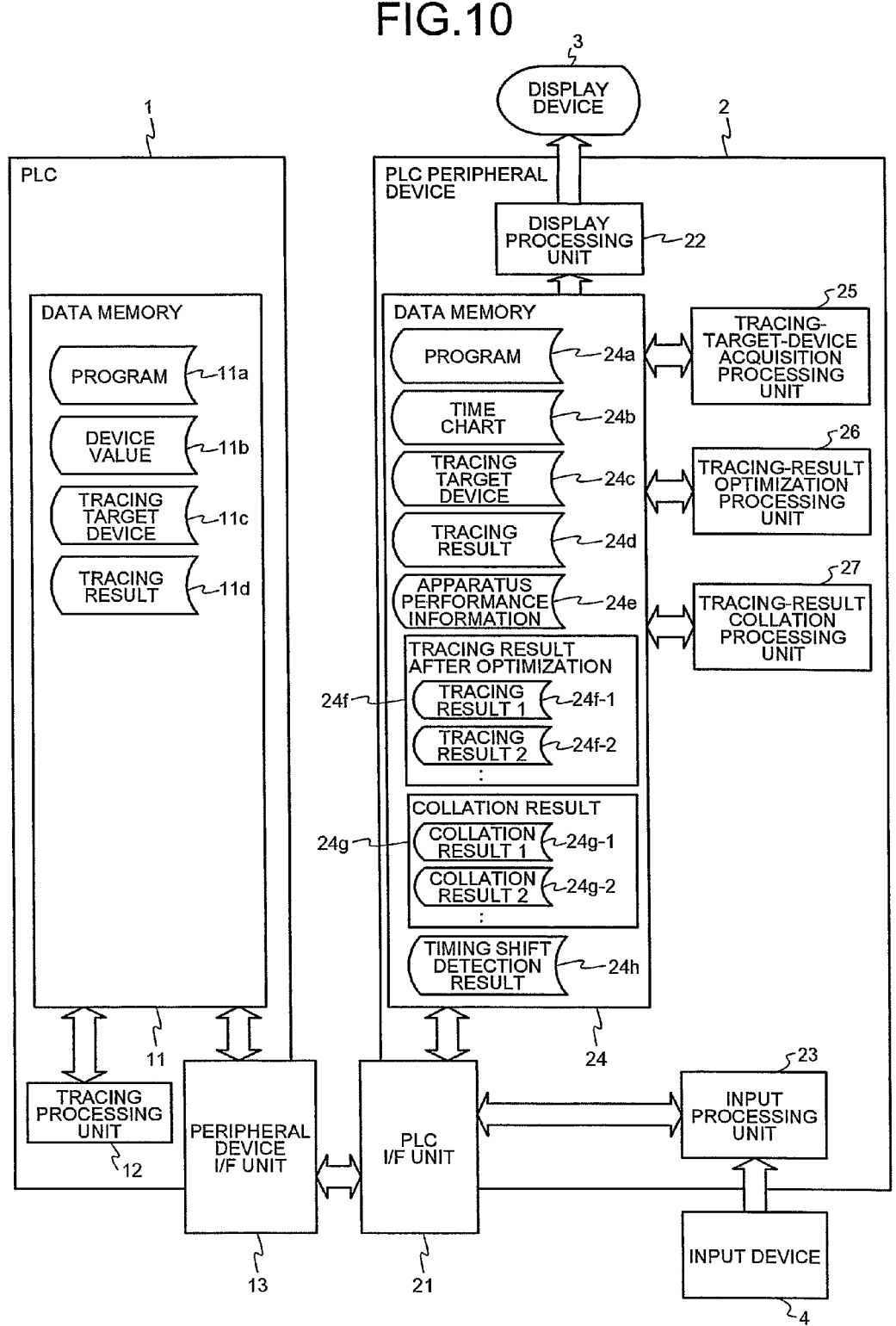
FIG. 10 is a schematic block diagram of the structure of the PLC peripheral device according to the present invention and the PLC.

FIG. 10 is a schematic block diagram of the structure of the second embodiment of the PLC peripheral device according to the present invention and the PLC. In the PLC peripheral device 2, the data memory 24 in the PLC peripheral device 2 shown in FIG. 1 according to the first embodiment can accumulate and store the tracing result after optimization 24f and the collation result 24g. For example, as the tracing result after optimization 24f, a "tracing result 1" 24f-1, a "tracing result 2" 24f-2, and the like as tracing results in the first time, the second time, and the like are stored. As the collation result 24g, a "collation result" 24g-1, a "collation result 2" 24g-2, and the like as collation results in the first time, the second time, and the like are stored. The data memory 24 can store a timing shift detection result 24h detected by the tracing-result collation processing unit 27.

Moreover, the tracing-result collation processing unit 27 collates the tracing result after optimization 24f and the time chart 24b of the apparatus corresponding thereto. The tracing-result collation processing unit 27 displays the tracing results after optimization 24f for the number of times of execution of the automatic verification processing and performs collation for each of the tracing results after optimization using the time chart 24b as a reference. The tracing-result collation processing unit 27 further has a function of, when the tracing result after optimization 24f is within the range of the allowable error ratio compare with the time chart 24b, judging that the tracing result after optimization 24f coincides with the time chart 24b but, when the tracing result after optimization 24f exceeds the range of the allowable error ratio compared with the time chart 24b, detecting the shift of the tracing result after optimization 24f as timing shift and judging that the shift is timing shift due to elapse of time. The tracing-result collation processing unit 27 stores the detected timing shift detection result 24h in the data memory 24. Components same as those in the first embodiment are denoted by the same reference numerals and signs and explanation of the components is omitted.

Figure 11:
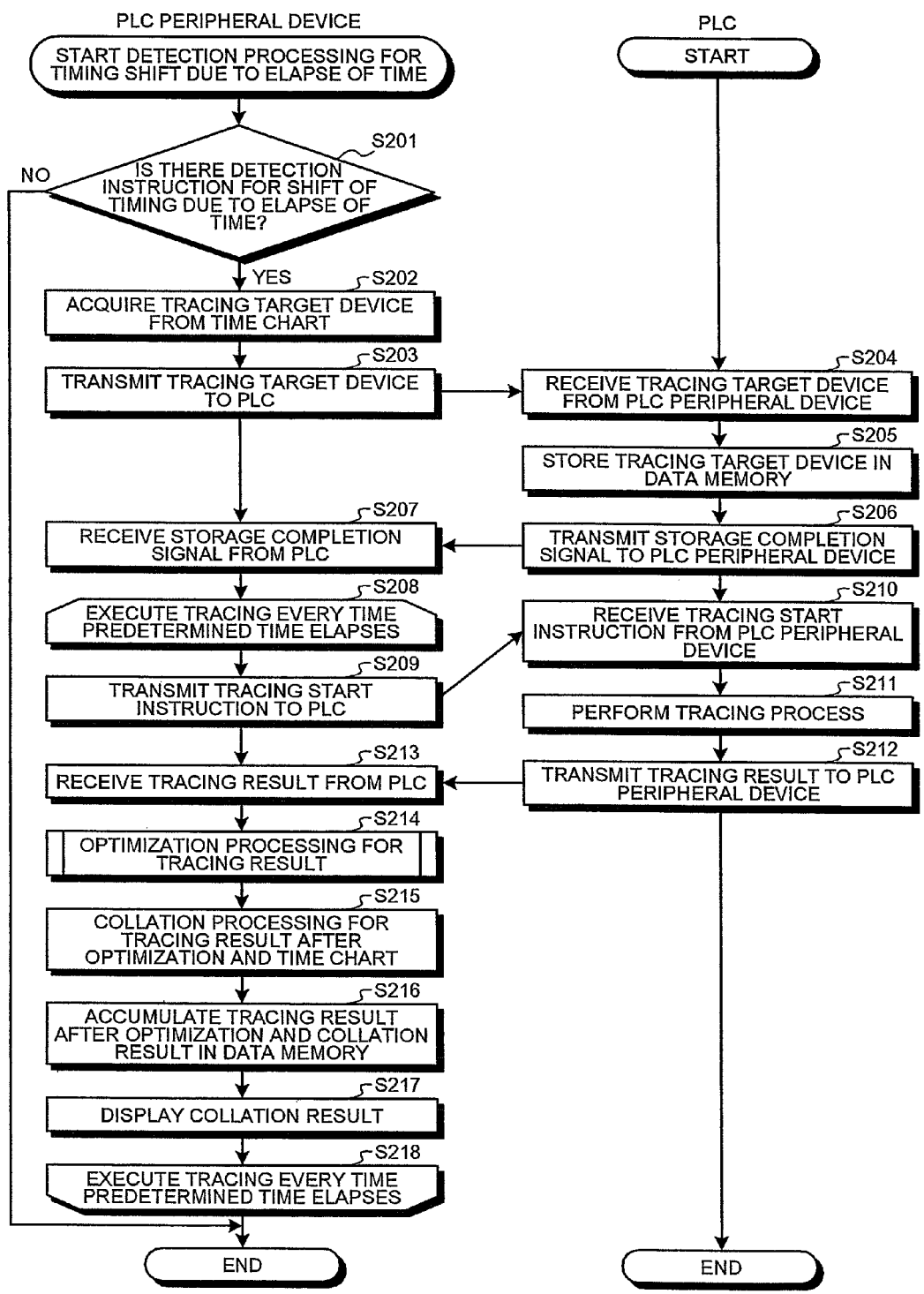
FIG. 11 is a flowchart of an example of detection processing for timing shift due to elapse of time in the PLC peripheral device.

A method of detecting the shift of timing due to elapse of time by comparing tracing results accumulated in the PLC peripheral device 2 having such a configuration and the time chart is explained. FIG. 11 is a flowchart of an example of detection processing for timing shift due to elapse of time in the PLC peripheral device.

First, the PLC peripheral device 2 judges presence or absence of an instruction for detection processing for timing shift due to elapse of time from the user (step S201). When there is no instruction for detecting timing shift due to elapse of time ("No" at step S201), the PLC peripheral device 2 finishes the detection processing for timing shift due to elapse of time. On the other hand, when there is an instruction for detecting timing shift due to elapse of time ("Yes" at step S201), the tracing-target-device acquisition processing unit 25 acquires a tracing target device from the time chart 24b in the data memory 24 (step S202) and sets the tracing target device 24c in the data memory 24. Thereafter, the tracing-target-device acquisition processing unit 25 transmits the acquired tracing target device to the PLC 1 via the PLC I/F unit 21 (step S203).

Subsequently, in the same manner as steps S104 to S106 in the first embodiment, the PLC 1 receives the tracing target device from the PLC peripheral device 2. After storing the tracing target device in the data memory 11, the tracingtarget-device acquisition processing unit 25 transmits a storage completion signal indicating that the received tracing target device 11c in the data memory 11 to the PLC peripheral device 2 (steps S204 to S206).

Subsequently, the PLC peripheral device 2 receives the storage completion signal from the PLC 1 (step S207). The PLC peripheral device 2 starts tracing execution processing for executing tracing at every predetermined time (steps S208 to S218). The PLC peripheral device 2 transits a tracing start instruction to the PLC 1 (step S209). The PLC 1 receives the tracing start instruction from the PLC peripheral device 2 (step S210), executes tracing in the tracing unit 12 (step S211), and stores the tracing result 11d of the tracing in the data memory 11. Thereafter, after executing the tracing, the PLC 1 transmits a tracing result to the PLC peripheral device 2 (step S212).

The PLC peripheral device 2 receives the tracing result from the PLC 1 (step S213) and stores the tracing result in the data memory 24. A performance error of an external apparatus, for which the tracing is executed, is included in the tracing result 24d. Therefore, optimization processing for the tracing result by the tracing-result optimization processing unit 26 is executed (step S214). The optimization processing for the tracing result is the processing explained with reference to FIG. 5 in the first embodiment. The optimization processing is performed by subtracting the reference response time in the apparatus performance information 24e concerning an apparatus as a target of the tracing from the tracing result 24d in the data memory 24.

Figure 12:
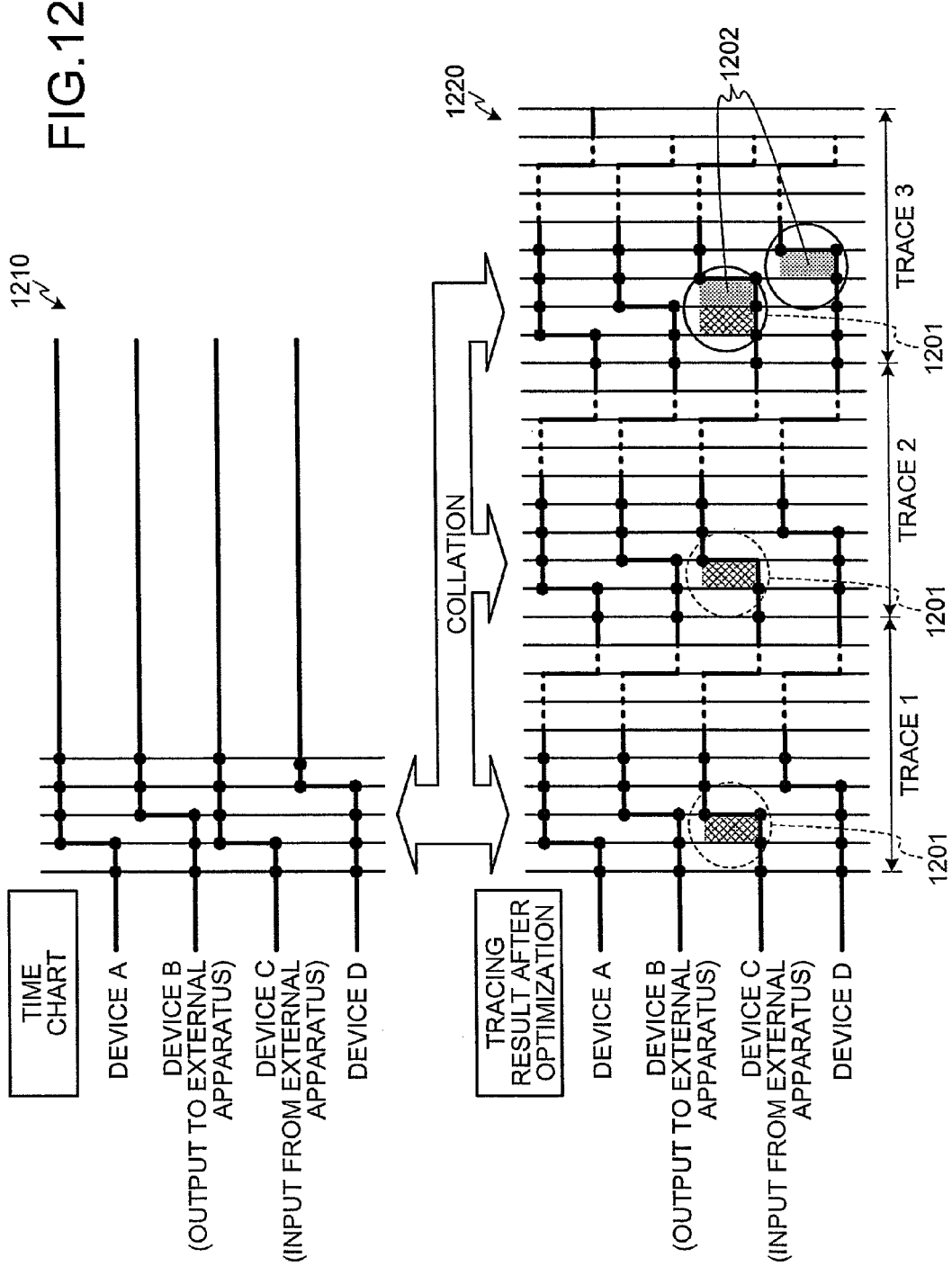
FIG. 12 is a diagram of an example of collation processing for detecting the shift of timing due to elapse of time in the PLC peripheral device.

Subsequently, the tracing-result collation processing unit 27 carries out collation processing for comparing the tracing result after optimization 24f with the time chart 24b of the apparatus corresponding thereto stored in the data memory 24 (step S215). FIG. 12 is a diagram of an example of collation processing for detecting timing shift due to elapse of time in the PLC peripheral device. A time chart 1210 as a reference and a tracing result after optimization 1220 are shown in FIG. 12. As indicated by traces 1 and 2 of the tracing result after optimization 1220 on a lower side of FIG. 12, a hatched range is a performance range of the apparatus (a range set by taking into account an allowable error ratio) 1201. When the tracing result after optimization is within the performance range 1201 of the apparatus, the tracing-result collation processing unit 27 judges that the tracing result after optimization coincides with the time chart. On the other hand, as indicated by a trace 3 of the tracing result after optimization 1220 on the lower side of FIG. 12, when the tracing result exceeds the performance range 1201 of the apparatus, the tracing-result collation processing unit 27 detects, as timing shift due to elapse of time, a range 102 exceeding the performance range of the apparatus, i.e., a difference between the tracing result after optimization and the time chart.

Subsequently, the tracing-result collation processing unit 27 stores the tracing result after optimization 24f and the collation result 24g in the data memory 24 and stores, if there is timing shift, the timing shift detection result 24h in the data memory 24 (step S216). The display processing unit 22 extracts a section as a cause of the shift of timing due to elapse of time and displays the section on the display device 3 connected to the PLC peripheral device 2 (step S217). The detection processing for timing shift due to elapse of time ends. A method of indicating, when timing shift due to elapse of time is detected at step S217, the section as a cause of the timing shift to the user is explained in a fourth embodiment. Steps S209 to S218 are repeatedly executed at every predetermined time.

According to the second embodiment, because the tracing result after optimization is accumulated and stored, there is an effect that it is possible to detect the shift from the time chart due to elapse of time.

Third Embodiment

In a third embodiment of the present invention, a PLC peripheral device is explained that can correct, when timing shift is detected as a result of collating the time chart and the tracing result after optimization in the first embodiment, a setting value and the like of a timer included in a sequence program and automatically correct the timing shift.

Figure 13:
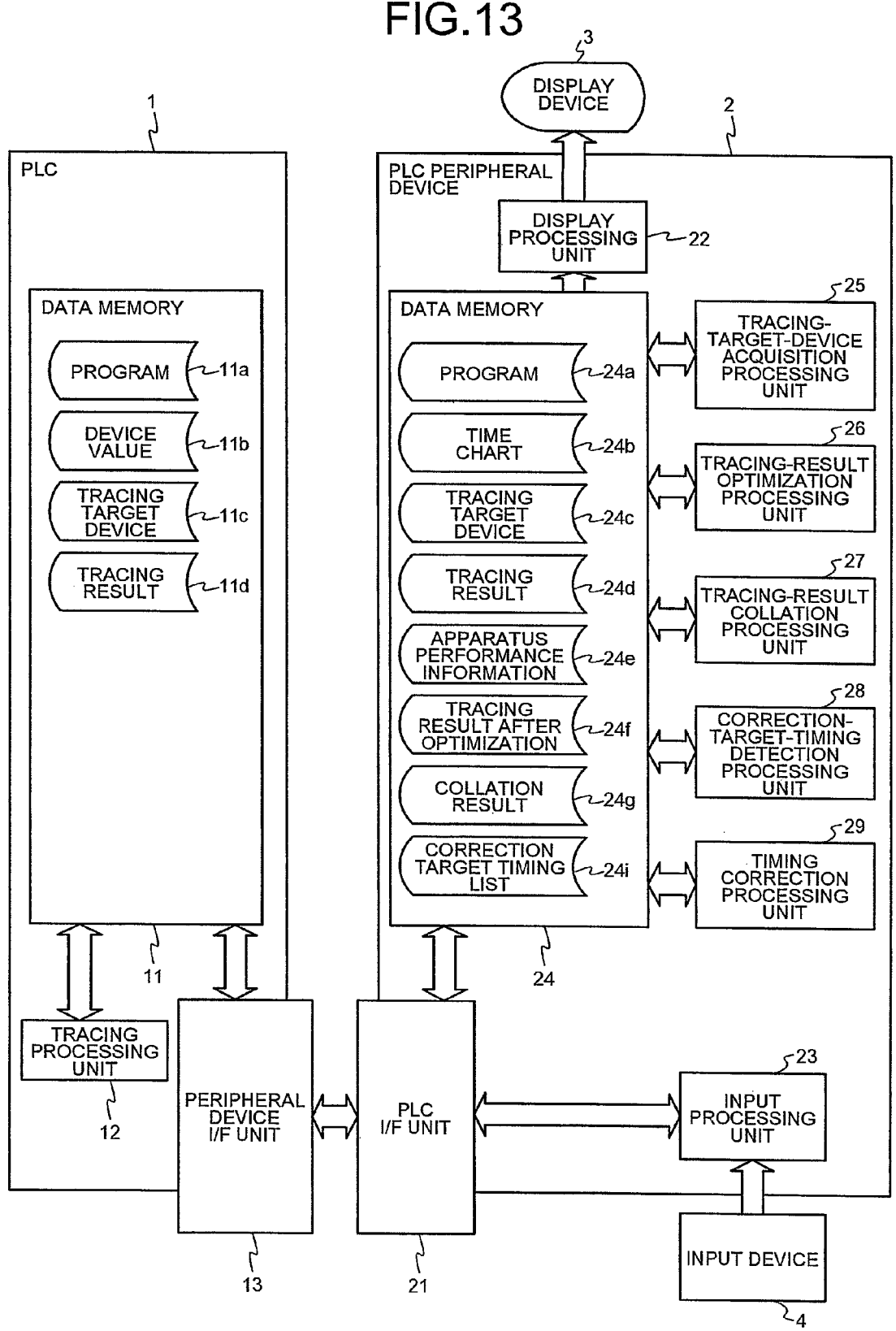
FIG. 13 is a schematic block diagram of the structure of a third embodiment of the PLC peripheral device according to the present invention and the PLC.

FIG. 13 is a schematic block diagram of the structure of the third embodiment of the PLC peripheral device according to the present invention and the PLC. The PLC peripheral device 2 further includes, in the PLC peripheral device 2 shown in FIG. 1 according to the first embodiment, a correction-target-timing detection processing unit 28 that detects, based on the collation result 24g, timing that needs to be corrected in a sequence program, and a timing correction processing unit 29 that corrects the sequence program based on a correction target timing list 24i detected by the correction-target-timing detection processing unit 28. The data memory 24 further stores the correction target timing list 24i as a list of timing of correction targets.

The correction-target-timing detection processing unit 28 detects, based on the collation result 24g, timing that needs to be corrected, extracts a section in which a timer is used before the detected timing from the sequence program, calculates, with respect to a present setting value of the timer, a value with which a difference does not occur between the time chart 24b and the tracing result after optimization 24f, and calculates a new timer setting value using the value. The detected timing on the sequence program when correction is necessary and the correction timing including the new timer setting value are stored in the data memory 24 as one piece of information of the correction target timing list 24i.

The timing correction processing unit 29 corrects, based on the correction target timing list 24i created by the correction-target-timing detection processing unit 28, a setting value of the timer present before the timing on the sequence program, which needs to be corrected, to a new timer setting value.

Figure 14:
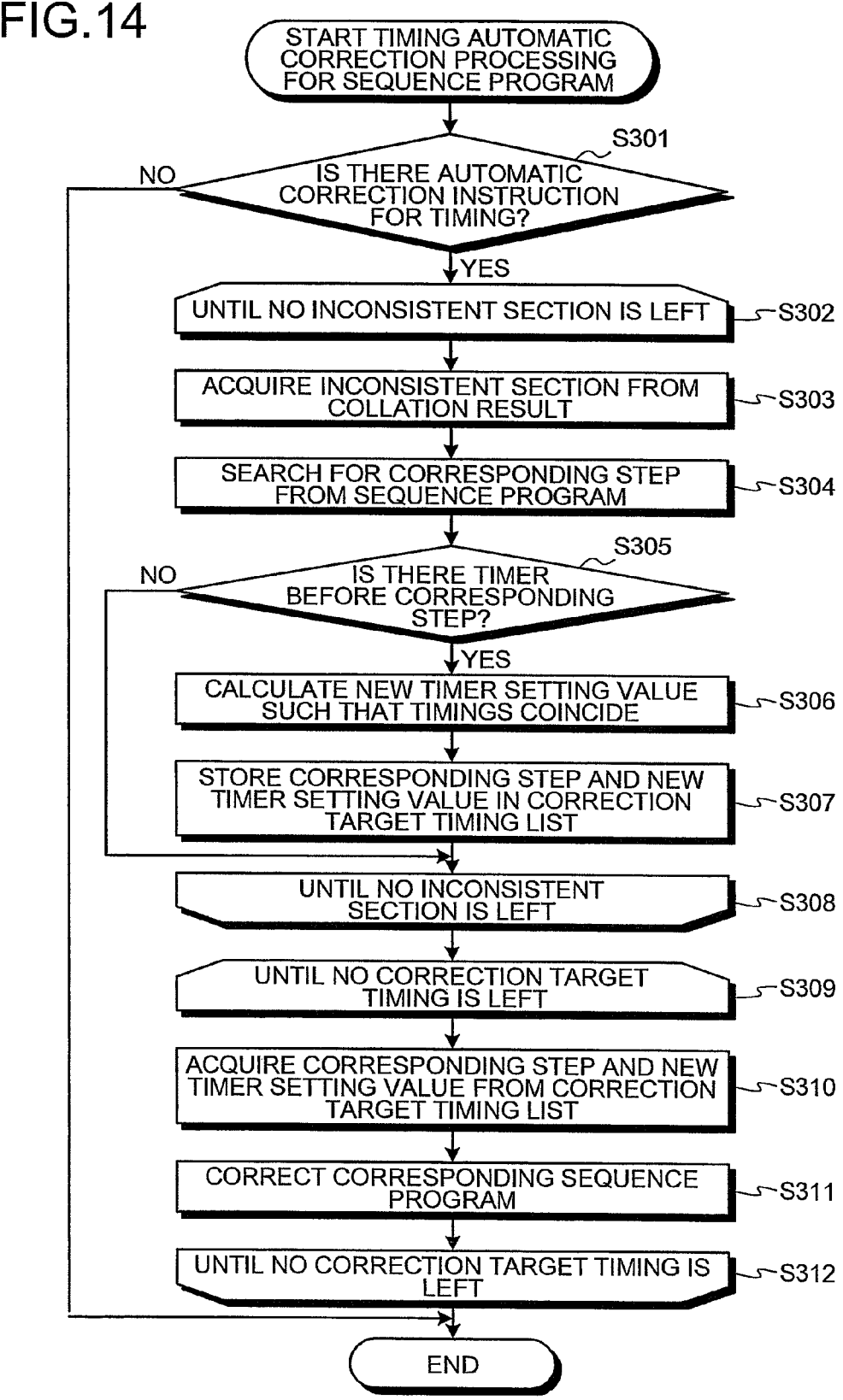
FIG. 14 is a flowchart of an example of a procedure of timing automatic correction processing for a sequence program in the PLC peripheral device.

FIG. 14 is a flowchart of an example of a procedure of timing automatic correction processing for a sequence program in the PLC peripheral device. First, the PLC peripheral device 2 discriminates presence or absence of an automatic correction instruction or the sequence program from the user (step S301). When there is no automatic correction instruction for the sequence program ("No" at step S301), the automatic correction processing for the sequence program in the PLC peripheral device 2 ends. On the other hand, when there is an automatic correction instruction for the sequence program ("Yes" at step S301), the PLC peripheral device 2 executes processing for detecting, from the sequence program, a section where the tracing result after optimization 24f shifts from the time chart 24b (steps S302 to S308).

The correction-target-timing detection processing unit 28 acquires an inconsistent section using the time chart 24b in the data memory 24 and the collation result 24g of the tracing result after optimization 24f (step S303). The correction-target-timing detection processing unit 28 searches for a step corresponding to the inconsistent section from the sequence program in the program 24a stored in the data memory 24 (step S304). For example, the correction-target-timing detection processing unit 28 searches for the corresponding step in the sequence program based on a device corresponding to tracing result data having the inconsistent section. Thereafter, the correction-target-timing detection processing unit 28 discriminates whether there is timer processing before the found step (step S305). As a result, when there is the timer processing ("Yes" at step S305), the correction-target-timing detection processing unit 28 calculates, with respect to a present setting value of the timer, a value with which a difference does not occur between the time chart 24*b* and the tracing result after optimization 24*f* and calculates a new timer setting value using the value (step S306). The correction-target-timing detection processing unit 28 stores correction target timing data including the step found at step S304 and the new timer setting value calculated at step S306 in the correction target timing list 24*i* in the data memory 24 (step S307). On the other hand, when there is no timer processing before the corresponding step at step S305 ("No" at step S305), no processing is performed for the step. The processing from step S302 is executed until no inconsistent section is left between the time chart and the tracing result after optimization (steps S302 to S308).

Subsequently, the timing correction processing unit 29 executes the timing correction processing until no correction target timing data is left in the correction target timing list 24*i* (steps S309 to S312). The timing correction processing unit 29 acquires correction target timing data (the step that needs to be corrected and the new timer setting value) from the correction target timing list 24*i* in the data memory 24 (step S310) and executes, with respect to the sequence program in the program 24*a* of the data memory 24, correction processing for the program for changing a timer setting value of timer processing present before the correction target step to the acquired new timer setting value (step S311). The processing from step S309 is executed as the timing correction processing until no uncorrected correction target timing data is left in the correction target timing list 24*i* (steps S309 to S312). The timing automatic correction processing for the sequence program ends.

Figure 15:
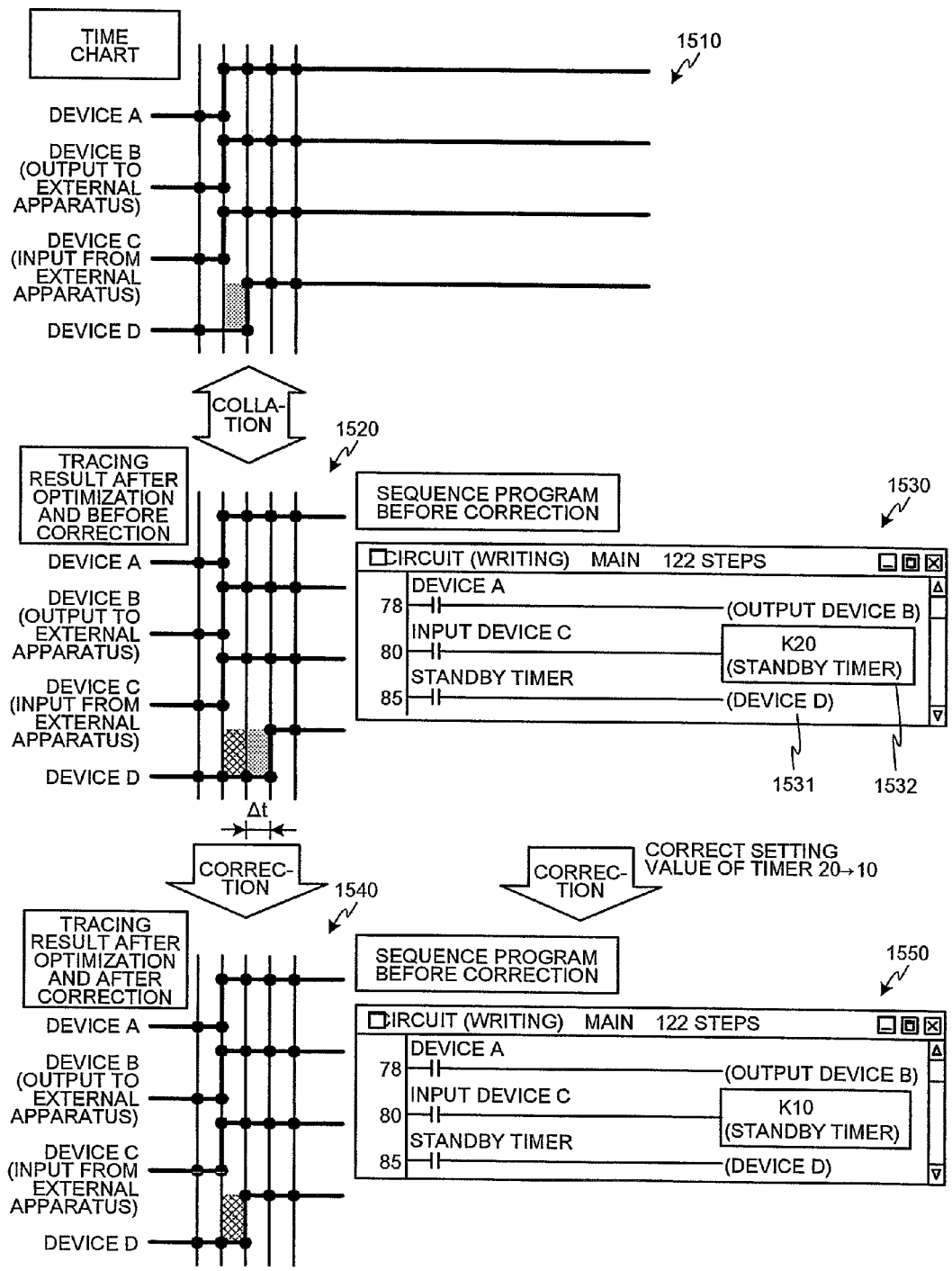
FIG. 15 is a diagram of a specific example of timing automatic correction for a sequence program in the PLC peripheral device.

FIG. 15 is a diagram of a specific example of timing automatic correction for a sequence program in the PLC peripheral device. In this figure, a time chart 1510, a tracing result after optimization 1520 and a sequence program 1530 before timing correction, and a tracing result after optimization 1540 and a sequence program 1550 before timing correction are shown. In the figure, a device D of the tracing result after optimization 1540 after the correction has a result exceeding an allowable error ratio with respect to the time chart 1510 as a reference. The correction-target-timing detection processing unit 28 acquires the sequence program 1530 before correction from the data memory and judges whether there is timer processing before a "device D" 1531 of the sequence program 1530 before correction. Timer processing called a standby timer 1532 is present before the "device D" 1531 of the sequence program 1530 before correction. If time Δt during which a difference does not occur between the time chart 1510 and the tracing result after optimization 1520 is one second judging from the tracing result after optimization 1520 before correction and the timer chart 1510, the correction-target-timing detection processing unit 28 sets a new timer setting value obtained by correcting a setting value of the standby timer 1532 from "K20" to "K10". To specify a step, for example, a number "80" written on a bus on a left side of the sequence program is used. Thereafter, as indicated by the tracing result after optimization 1540 after correction and the sequence program 1550 after correction, the timing is corrected by the timing correction processing unit 29 based on the correction target timing.

According to the third embodiment, a place in the sequence program of the tracing result after optimization that shifts in timing compared with the time chart as a reference is specified and the timer setting value of the timer set before the specified position is corrected based on an amount of the shift. Therefore, there is an effect that it is possible to automatically obtain a sequence program having a tracing result matching the time chart.

Fourth Embodiment

In a fourth embodiment of the present invention, a PLC peripheral device is explained that can indicates, when the shift of timing due to elapse of time is detected in the second embodiment, a section causing the shift to a user.

Figure 16:
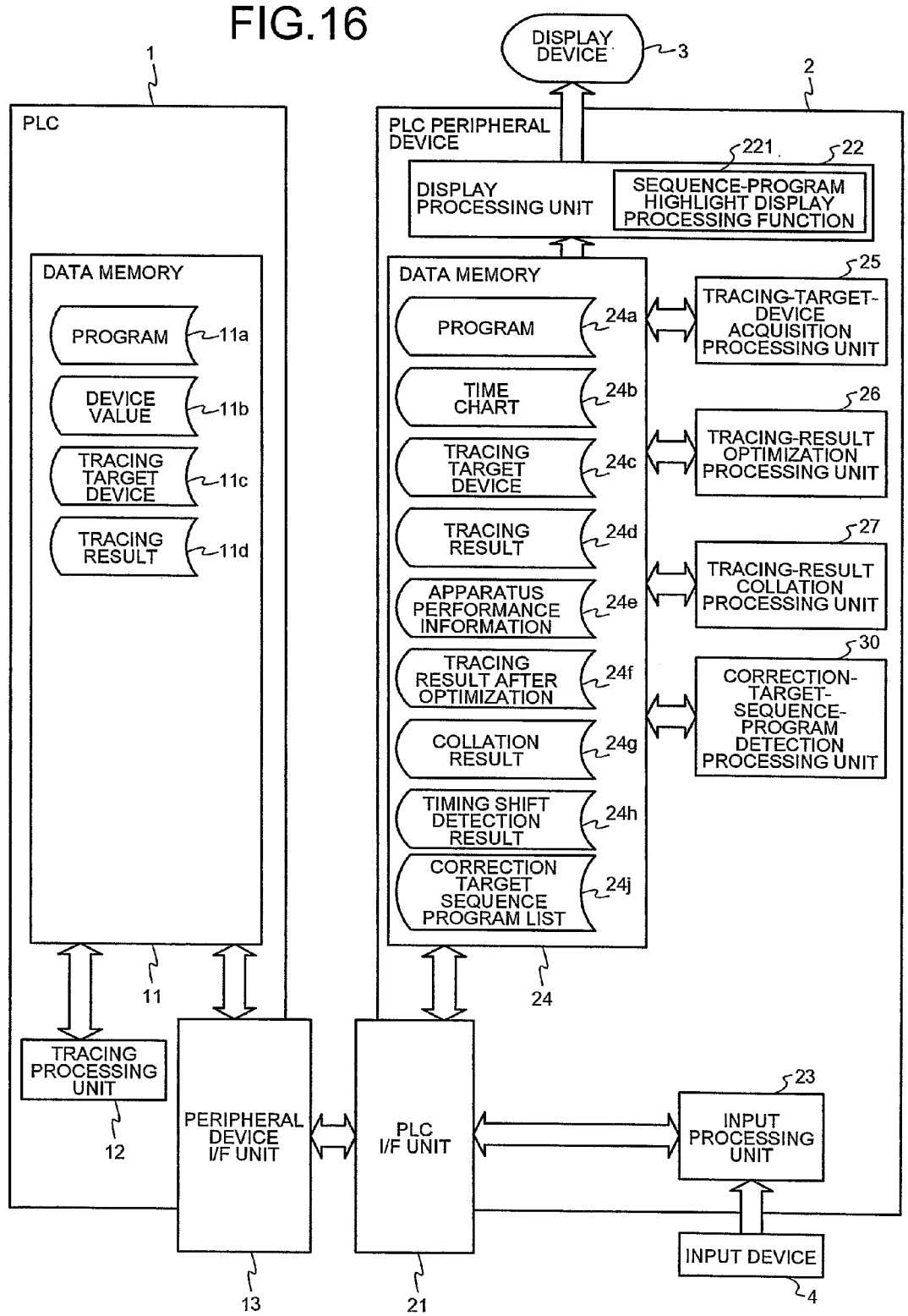
FIG. 16 is a schematic block diagram of the structure of a fourth embodiment of the PLC peripheral device according to the present invention and the PLC.

FIG. 16 is a schematic block diagram of the structure of the fourth embodiment of the PLC peripheral device according to the present invention and the PLC. The PLC peripheral device 2 further includes, in the PLC peripheral device 2 shown in FIG. 10 according to the second embodiment, a correction-target-sequence-program detection processing unit 30 that detects, based on the timing shift detection result 24*h*, a section that needs to be correction in a sequence program. The display processing unit 22 further includes a sequence-program-highlighting function 211 for highlighting a position of a correction target in the sequence program displayed on the display device 3. The data memory 24 has a correction target sequence program list 24*j* as a correction target in the sequence program that is detected by the correction-target-sequence-program detection processing unit 30 and causes the shift of timing. Components same as those in the first and second embodiments are denoted by the same reference numerals and signs and explanation of the components is omitted.

Figure 17:
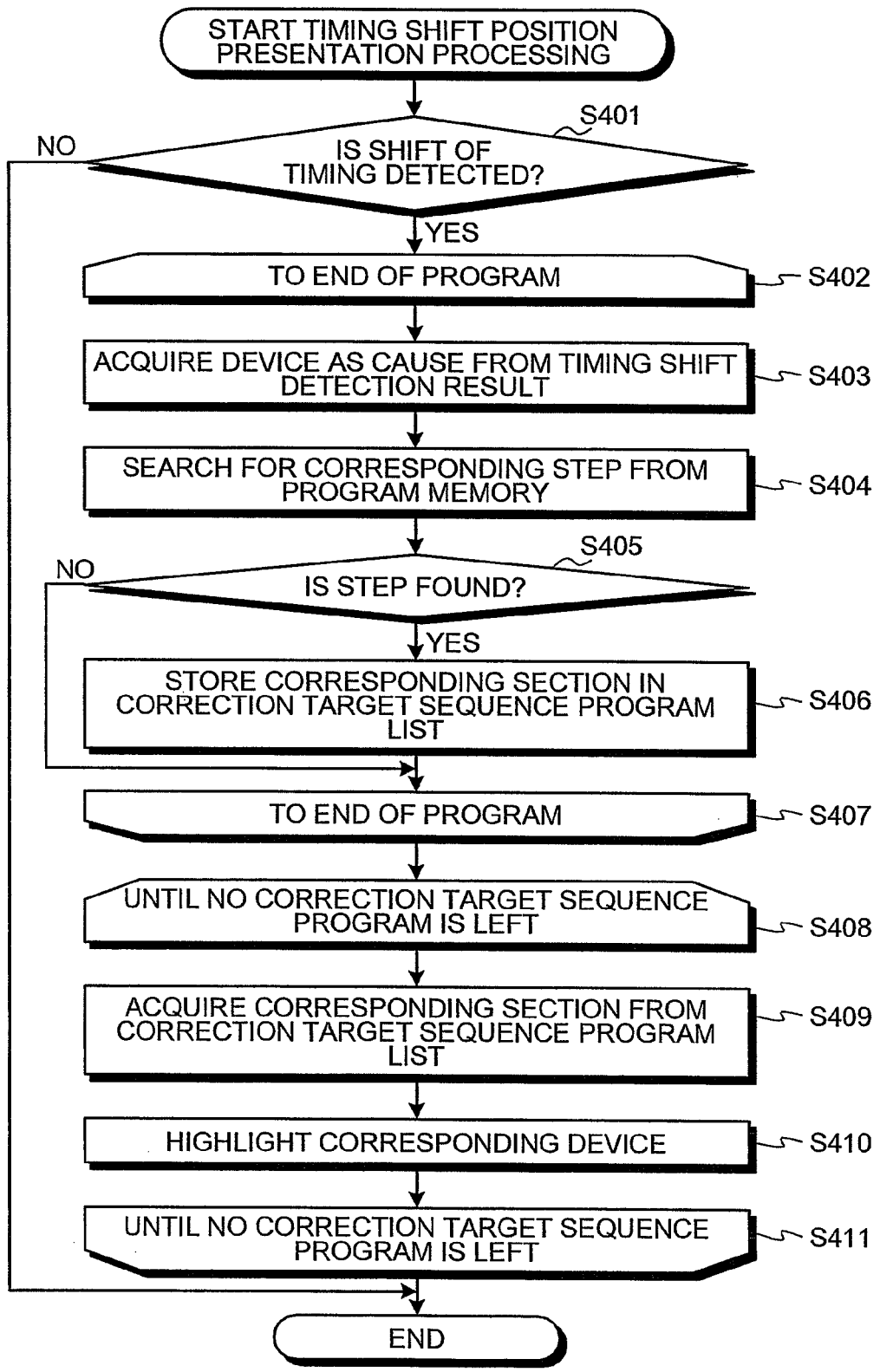
FIG. 17 is a flowchart of an example of a procedure of position presentation processing for a sequence program in the PLC peripheral device.

FIG. 17 is a flowchart of an example of a procedure of position presentation processing for a sequence program that causes timing shift due to elapse of time of the PLC peripheral device. First, the PLC peripheral device 2 checks whether timing shift due to elapse of time is detected (step S401). The detection of timing shift due to elapse of time is performed by the tracing-result collation processing unit 27 and a result of the detection is stored in the data memory 24 as the timing shift detection result 24*h*. Therefore, presence or absence of detection of timing shift can be judged according to presence or absence of the timing shift detection result 24*h* in the data memory 24. The timing shift detection processing by the tracing-result collation processing unit 27 is explained in the second embodiment. Therefore, explanation of the timing shift detection processing is omitted. When timing shift due to elapse of time is not detected ("No" at step S401), the PLC peripheral device 2 finishes the timing shift position presentation processing. On the other hand, when timing shift due to elapse of time is detected ("Yes" at step S401), the PLC peripheral device 2 performs detection processing for a position on the sequence program that causes the timing shift (steps S402 to S407).

First, the correction-target-sequence-program detection processing unit 30 acquires a device as a cause from the timing shift detection result 24*h* (step S403). The correction-target-sequence-program detection processing unit 30 searches for, based on the acquired device, a step corresponding to the device in the program (sequence program) 24*a* of the data memory 24 (step S404). For example, the correction-target-sequence-program detection processing unit 30 searches for, based on a device corresponding to tracing result data in which timing shift is detected, a step corresponding to the device in the sequence program. As a result of the search, when a step corresponding to the device is found ("Yes" at step S405), the correction-target-sequence-program detection processing unit 30 stores a corresponding section in the sequence program in the correction target sequence program list 24j as a correction target sequence program (step S406). When a step corresponding to the device is not found at step S405 ("No" at step S405), no processing for the step is performed. The processing from step S402 is executed to the last of the sequence program (steps S402 to S407).

Subsequently, a sequence-program highlighting function 221 of the display processing unit 22 executes the highlighting processing until no correction target sequence is left in the correction target sequence program list 24j (steps S408 to S411). The sequence-program highlighting function 221 of the display processing unit 22 acquires a position on a program that needs to be corrected from the correction target sequence program list 24j (step S409) and highlights a device corresponding to the position on the display device 3 (step S410). After the sequence-program highlighting function 221 of the display processing unit 22 executes the highlighting until the corresponding correction target sequent program is not left (steps S409 to S411), the timing shift position presentation processing ends.

According to the fourth embodiment, a position on the sequence program that causes timing shift due to elapse of time is indicated to the user. Therefore, there is an effect that it is possible to specify a cause of the time shift in the sequence program.

Fifth Embodiment

In a fifth embodiment of the present invention, a PLC peripheral device is explained that can search for, when it is necessary to correct the sequence program in the third embodiment, a section where a device as a cause of the correction is used and indicates a related sequence program section to a user.

Figure 18:
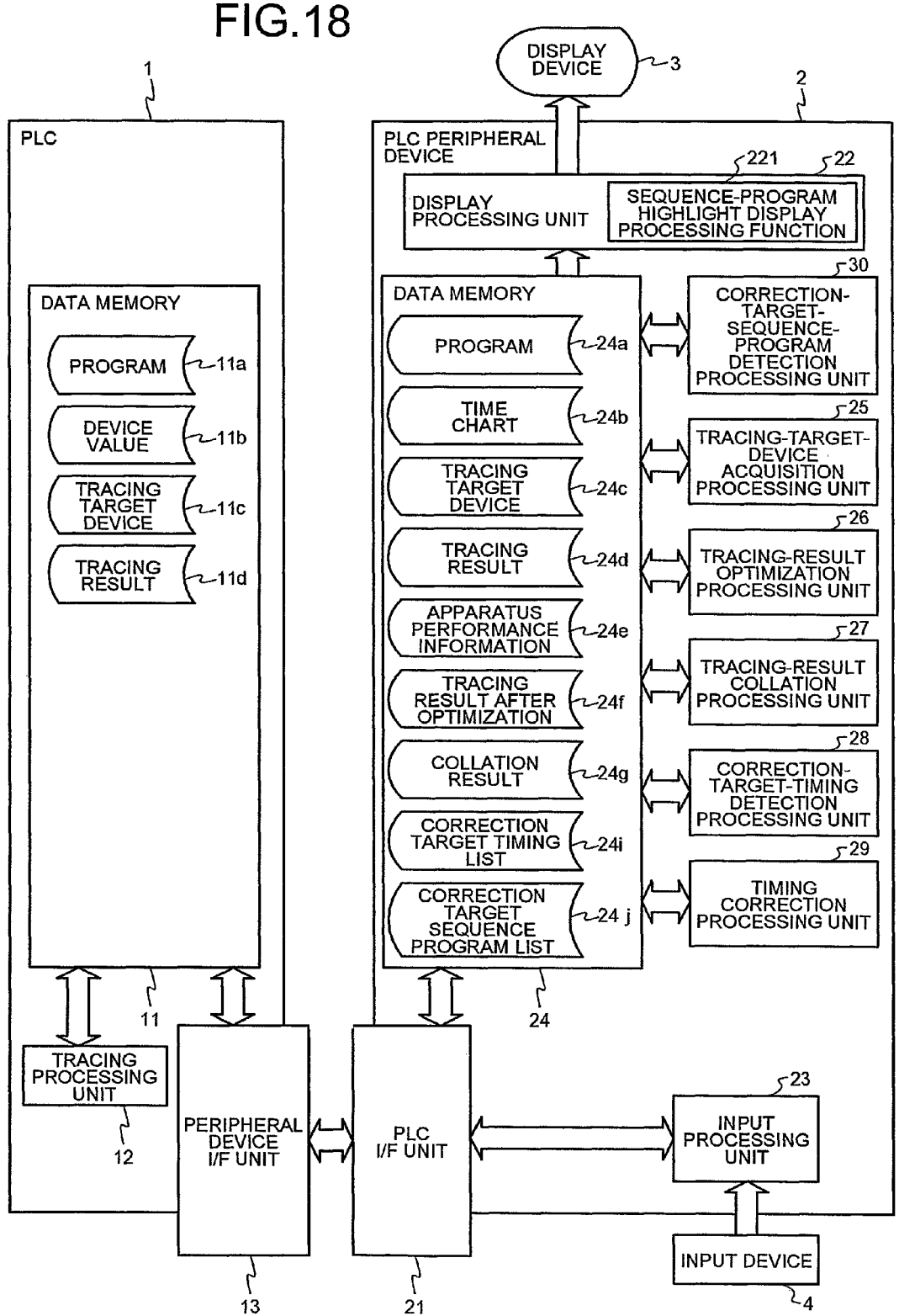
FIG. 18 is a schematic block diagram of the structure of a fifth embodiment of the PLC peripheral device according to the present invention and the PLC.

FIG. 18 is a schematic block diagram of the structure of the fifth embodiment of the PLC peripheral device according to the present invention and the PLC. The PLC peripheral device 2 further includes, in the PLC peripheral device 2 shown in FIG. 13 according to the third embodiment, the correction-target-sequence-program detection processing unit 30 that detects, based on the collation result 24g, timing that needs to be corrected and detects a sequence program that needs to be corrected. The display processing unit 22 further includes the sequence-program highlighting function 221 for highlighting a sequence program that needs to be corrected in sequence programs displayed on the display device 3. The data memory has a correction target sequence program list including the sequence program that needs to be corrected. Components same as those in the first and third embodiments are denoted by the same reference numerals and signs and explanation of the components is omitted. Functions of the correction-target-sequence-program detection processing unit 30 and the sequence-program highlighting function 221 of the display processing unit 22 are the same as those explained in the fourth embodiment. Therefore, explanation of the functions is omitted.

Figure 19:
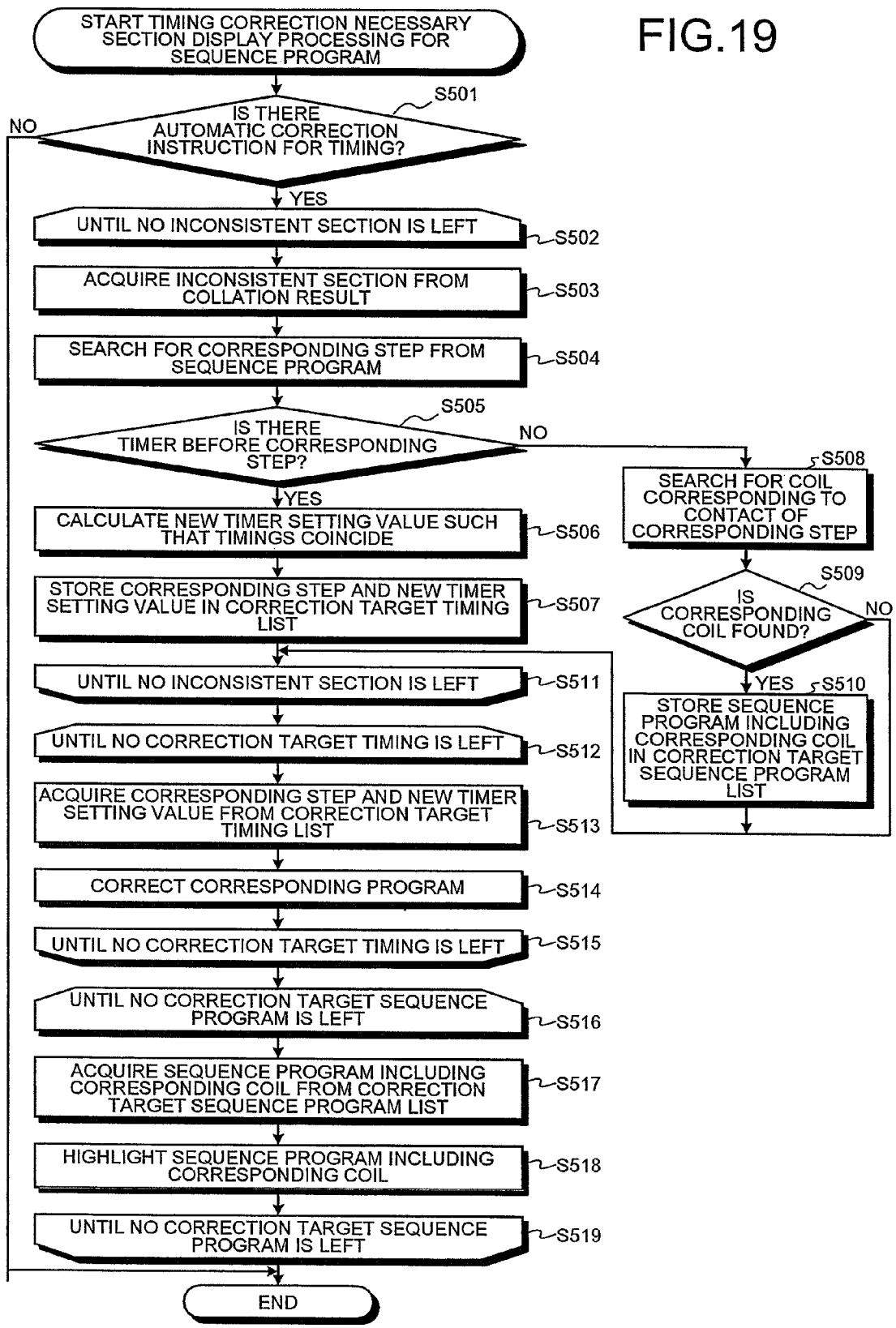
FIG. 19 is a flowchart of an example of a procedure of timing correction necessary section display processing of a sequence program in the PLC peripheral device.

FIG. 19 is a flowchart of an example of a procedure of timing correction necessary section display processing during timing automatic correction for a sequence program of the PLC peripheral device. First, the PLC peripheral device 2 discriminates presence or absence of an automatic correction instruction for timing of a sequence program (step S501). When there is no automatic correction instruction for timing of the sequence program ("No" at step S501), the timing correction necessary section display processing for the sequence program in the PLC peripheral device 2 ends. On the other hand, when there is an automatic correction instruction for timing of the sequence program ("Yes" at step S501), the PLC peripheral device 2 executes processing for detecting, from the sequence program, a section where a tracing result after optimization shifts from a time chart (steps S502 to S511).

The correction-target-timing detection processing unit 28 acquires an inconsistent section using the time chart 24b in the data memory 24 and the collation result 24g of the tracing result after optimization 24f (step S503). The correction-target-timing detection processing unit 28 searches for a step corresponding to the inconsistent section from the sequence program in the program 24a stored in the data memory 24 (step S504). For example, the correction-target-timing detection processing unit 28 searches for the corresponding step in the sequence program based on a device corresponding to tracing result data having the inconsistent section. Thereafter, the correction-target-timing detection processing unit 28 discriminates whether there is timer processing before the found step (step S505). As a result, when there is the timer processing ("Yes" at step S505), the correction-target-timing detection processing unit 28 calculates, with respect to a present setting value of the timer, a value with which a difference does not occur between the time chart 24b and the tracing result after optimization 24f and calculates a new timer setting value using the value (step S506). The correction-target-timing detection processing unit 28 stores correction target timing data including the step found at step S504 and the new timer setting value calculated at step S506 in the correction target timing list 24i in the data memory 24 (step S507).

On the other hand, when there is no timer processing before the corresponding step at step S505 ("No" at step S505), the correction-target-sequence-program detection processing unit 30 searches for a coil corresponding to a contact of the corresponding step in the sequence program (step S508). As a result, when the correction-target-sequence-program detection processing unit 30 finds the corresponding coil ("Yes" at step S509), the correction-target-sequence-program detection processing unit 30 stores a start step and an end step of the sequence program including the coil in the correction target sequence program list 24j as a correction target sequence program (step S510). When the correction-target-sequence-program detection processing unit 30 cannot find the corresponding coil ("No" at step S509), no processing is performed for the step. The processing from step S502 is executed until no inconsistent section is left between the time chart and the tracing result after optimization (steps S502 to S511).

Subsequently, the timing correction processing unit 29 executes the timing correction processing until no correction target timing data is left in the correction target timing list 24i (steps S512 to S515). The timing correction processing unit 29 acquires correction target timing data (the step that needs to be corrected and the new timer setting value) from the correction target timing list 24i in the data memory 24 (step S513) and executes, with respect to the sequence program in the data memory 24, correction processing for the program for changing a timer setting value of timer processing present before the correction target step to the acquired new timer setting value (step S514). The processing from step S512 is executed as the timing correction processing until no uncorrected correction target timing data is left in the correction target timing list 24i (steps S512 to S515).

Thereafter, the sequence-program highlighting function 221 of the display processing unit 22 executes the highlighting processing until no correction target sequence is left in the correction target sequence program list 24j (steps S516 to S519). The sequence-program highlighting function 221 of the display processing unit 22 acquires a start step and an end step of the correction target sequence program from the correction target sequence program list 24j (step S517) and highlights the correction target sequence program (step S518). The sequence-program highlighting function 221 of the display processing unit 22 carries out the highlighting until not corresponding correction target sequence program is left (steps S516 to S519). Consequently, a position in the sequence program for which automatic correction of timing is not performed at steps S512 to S515 is indicated to the user. The timing correction necessary section display processing for the sequence program in the PLC peripheral device 2 ends.

Figure 20:
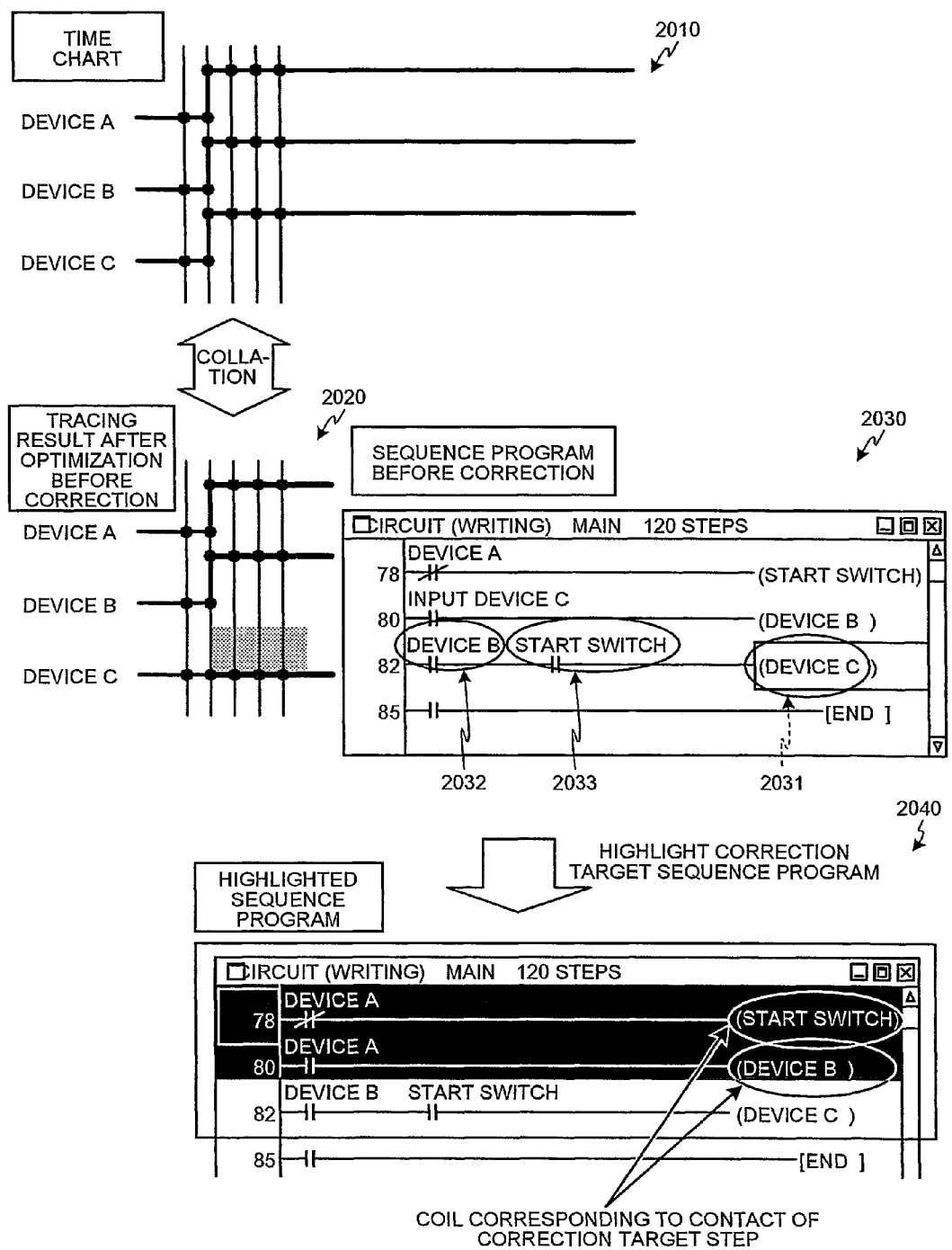
FIG. 20 is a diagram of an example of the timing correction necessary section display processing of the sequence program in the PLC peripheral device.

FIG. 20 is a diagram of an example of the timing correction necessary section display processing for the sequence program in the PLC peripheral device. As shown in the figure, a tracing result after optimization 2020 before timing correction is compared and collated with a time chart 2010 as a reference. A position on a sequence program 2030 where the tracing result after optimization 2020 and the time chart 2010 do not coincide with each other is detected. When there is no coil processing before a step corresponding to the position, a coil corresponding to a contact of a correction target step is searched. In the case shown in FIG. 20, looking at the tracing result after optimization 202 before correction, tracing result data of a device C does not coincide with the time chart. Thus, looking at the sequence program 2030 before correction, there is no timer before the "device C" 2031 as the correction target step. Therefore, a "device B" 2032 and a "start switch" 2033 as contacts of a step having the "device C" 2031 are extracted. Thereafter, a "step 78" and a "step 80" as steps in the sequence program 2030 having the "device B" 2032 and the "start switch" 2033 as coils are stored in the correction target sequence program list as a correction target sequence program. The sequence-program highlighting function 221 of the display processing unit 22 performs processing for highlighting the steps stored in this correction target sequence program list. In the case of FIG. 20, as indicated by a sequence program 2040, the "step 78" and the "step 80" including the "device B" and the "start switch" as coils are highlighted.

According to the fifth embodiment, during the timing automatic correction for the sequence program of the PLC peripheral device, a position of the sequence program that needs to be corrected, in which timing is not automatically corrected, is clearly shown. Therefore, there is an effect that it is easy to pursue a cause when shift occurs between a time chart and a tracing result and it is possible to efficiently carry out debagging work.

INDUSTRIAL APPLICABILITY

As explained above, the peripheral device of the PLC according to the present invention are suitably used in performing debagging for a sequence program.

The invention claimed is:

1. A programmable-logic-controller peripheral device that is connected to a programmable logic controller, which controls an external apparatus based on a sequence program, and verifies an operation state of the sequence program in the programmable logic controller, the Programmable-logic-controller peripheral device comprising:
a tracing-result optimization processing unit that generates an optimized tracing result obtained by correcting, based on performance of the external apparatus, a tracing result obtained by the programmable logic controller executing sequence processing corresponding to a predetermined signal input/output unit out of external apparatuses;
a tracing-result collation processing unit that collates the optimized tracing result and a time chart as a basis of the sequence processing for the external apparatus and detects shift of the optimized tracing result; and
a tracing-result storing unit that accumulates and stores therein a tracing result obtained by the programmable logic controller executing, at predetermined time intervals, the sequence processing for the predetermined signal input/output unit out of the external apparatuses, wherein
every time the tracing result is stored in the tracing-result storing unit, the tracing-result optimization processing unit generates the optimized tracing result, and the tracing-result collation processing unit has a function of performing collation of the optimized tracing result and the time chart and detecting shift of timing due to elapse of time.

2. The Programmable-logic-controller peripheral device according to claim 1, further comprising:
a correction-target-sequence-program detection processing unit that acquires, when shift of timing due to elapse of time between the time chart and the optimized tracing result is detected from a collation result obtained by the tracing-result collation processing unit, a device as a cause of the shift of timing and acquires a step in the sequence program related to the device; and
a display processing unit that causes a display unit connected to the Programmable-logic-controller peripheral device to highlight the device as a cause of occurrence of the shift in timing in the sequence program.

3. A Programmable-logic-controller peripheral device that is connected to a programmable logic controller, which controls an external apparatus based on a sequence program, and verifies an operation state of the sequence program in the programmable logic controller, the Programmable-logic-controller peripheral device comprising:
a tracing-result optimization processing unit that generates an optimized tracing result obtained by correcting, based on performance of the external apparatus, a tracing result obtained by the programmable logic controller executing sequence processing corresponding to a predetermined signal input/output unit out of external apparatuses;
a tracing-result collation processing unit that collates the optimized tracing result and a time chart as a basis of the sequence processing for the external apparatus and detects shift of the optimized tracing result;
a correction-target-timing detection processing unit that determines, when shift of timing between the time chart and the optimized tracing result is detected from a collation result obtained by the tracing-result collation processing unit, whether there is processing that uses a timer before a step in the sequence program corresponding to the shift of timing and calculating, when there is the processing that uses the timer before the step, a new timer setting value with which an amount of the shift of timing is eliminated; and
a timing correction processing unit that sets the new timer setting value, which is generated by the correction-target-timing detection processing unit, as a timer setting value of the timer processing on the sequence program.

4. A Programmable-logic-controller peripheral device that is connected to a programmable logic controller, which controls an external apparatus based on a sequence program, and verifies an operation state of the sequence program in the programmable logic controller, the Programmable-logic-controller peripheral device comprising:
- a tracing-result optimization processing unit that generates an optimized tracing result obtained by correcting, based on performance of the external apparatus, a tracing result obtained by the programmable logic controller executing sequence processing corresponding to a predetermined signal input/output unit out of external apparatuses;
- a tracing-result collation processing unit that collates the optimized tracing result and a time chart as a basis of the sequence processing for the external apparatus and detects shift of the optimized tracing result; and
- a correction-target-sequence-program detection processing unit that extracts, when shift of timing between the time chart and the optimized tracing result is detected from a collation result obtained by the tracing-result collation processing unit, a step in the sequence program corresponding to the shift of timing and acquiring, as a step as a cause of occurrence of the shift of timing, a step having, as a coil, a device used as a contact in the step in the sequence program.

5. The Programmable-logic-controller peripheral device according to claim 4, further comprising a display processing unit that causes a display unit connected to the Programmable-logic-controller peripheral device to highlight the step as a cause of occurrence of the shift in timing in the sequence program.

* * * * *